United States Patent
Argoitia et al.

(10) Patent No.: US 6,749,936 B2
(45) Date of Patent: Jun. 15, 2004

(54) ACHROMATIC MULTILAYER DIFFRACTIVE PIGMENTS AND FOILS

(75) Inventors: Alberto Argoitia, Santa Rosa, CA (US); Paul T. Kohlmann, Windsor, CA (US); Matthew R. Witzman, Rohnert Park, CA (US); Paul G. Coombs, Santa Rosa, CA (US); Charles T. Markantes, Santa Rosa, CA (US); Richard A. Bradley, Jr., Santa Rosa, CA (US)

(73) Assignee: Flex Products, Inc., Santa Rosa, CA (US)

(*) Notice: Subject to any disclaimer, the term of this patent is extended or adjusted under 35 U.S.C. 154(b) by 69 days.

(21) Appl. No.: 10/029,405

(22) Filed: Dec. 20, 2001

(65) Prior Publication Data

US 2003/0129404 A1 Jul. 10, 2003

(51) Int. Cl.[7] ................................. B32B 5/16
(52) U.S. Cl. ................. 428/402; 428/148; 428/156; 428/163; 428/164; 428/167; 428/168; 428/172; 428/323; 428/328; 428/403; 427/296; 430/2; 430/10; 430/11; 430/292; 430/294; 264/144; 106/400; 106/401; 106/499; 106/640
(58) Field of Search ................. 428/402, 148, 428/156, 163, 164, 167, 168, 172, 323, 328, 403; 106/400, 401, 499, 640; 427/296; 264/144; 430/2, 10, 11, 292, 294

(56) References Cited

U.S. PATENT DOCUMENTS

| | | | |
|---|---|---|---|
| 3,011,383 A | 12/1961 | Sylvester et al. | |
| 4,126,373 A | 11/1978 | Moraw | |
| 5,171,363 A | 12/1992 | Phillips et al. | |
| 5,214,530 A | 5/1993 | Coombs et al. | |
| 5,214,580 A | 5/1993 | Aparo | |
| 5,254,390 A | 10/1993 | Lu | |
| 5,549,953 A | 8/1996 | Li | |
| 5,591,527 A | 1/1997 | Lu | |
| 5,672,410 A | * 9/1997 | Miekka et al. | 428/148 |
| 5,700,550 A | 12/1997 | Uyama et al. | |
| 5,856,048 A | 1/1999 | Tahara et al. | |
| 5,989,626 A | 11/1999 | Coombs et al. | |
| 6,013,370 A | 1/2000 | Coulter et al. | |
| 6,031,457 A | 2/2000 | Bonkowski et al. | |
| 6,045,230 A | 4/2000 | Dreyer et al. | |
| 6,150,022 A | 11/2000 | Coulter et al. | |
| 6,157,489 A | * 12/2000 | Bradley et al. | 359/584 |
| 6,236,510 B1 | * 5/2001 | Bradley et al. | 359/585 |
| 6,243,204 B1 | * 6/2001 | Bradley et al. | 359/585 |
| 6,246,523 B1 | * 6/2001 | Bradley et al. | 359/585 |
| 6,572,784 B1 | * 6/2003 | Coombs et al. | 252/301.16 |

FOREIGN PATENT DOCUMENTS

WO    WO 00/08596    2/2000

* cited by examiner

Primary Examiner—Leszek Kiliman
(74) Attorney, Agent, or Firm—Holme Roberts & Owen LLP

(57) ABSTRACT

Achromatic multilayer diffractive pigment flakes and foils are provided having diffractive structures thereon. The diffractive pigment flakes can have a symmetrical stacked coating structure on opposing sides of a reflective core layer, an asymmetrical stacked coating structure on one side of a reflective layer, or can be formed with one or more encapsulating coatings around the reflective core layer. The diffractive pigment flakes can be interspersed into liquid media such as paints or inks to produce diffractive compositions for subsequent application to a variety of objects. The foils can be laminated to various objects or can be formed on a carrier substrate. The diffractive pigment flakes and foils can be formed with a variety of diffractive structures thereon to produce selected optical effects. The diffractive foils and diffractive compositions applied to an object exhibit an iridescent diffractive effect over an achromatic background.

123 Claims, 22 Drawing Sheets

ACHROMATIC MULTILAYER DIFFRACTIVE PIGMENTS AND FOILS

BACKGROUND OF THE INVENTION

1. Field of the Invention

The present invention relates generally to optical effect pigments and foils. In particular, the present invention is related to diffractive pigment flakes and foils which can have a variety of diffractive structures on their surfaces to produce selected optical effects.

2. Background Technology

Various pigments, colorants, and foils have been developed for a wide variety of applications. For example, diffractive pigments have been developed for use in applications such as creating patterned surfaces, and security devices. Diffractive patterns and embossments have wide-ranging practical applications due to their aesthetic and utilitarian visual effects.

One very desirable decorative effect is the iridescent visual effect created by a diffraction grating. This striking visual effect occurs when light is diffracted into its color components by reflection from the diffraction grating. In general, diffractive gratings are essentially repetitive structures made of lines or grooves in a material to form a peak and trough structure. Desired optical effects occur within the visible spectrum occur when diffraction gratings have regularly spaced grooves at specified depths on a reflective surface.

The color changing properties of diffraction gratings and like structures are well known, particularly when used to form holographic images on continuous foils. One feature of diffractive surfaces as described above is that they perform better with directional illumination in order to be visualized. The continuous and rapid variation in color with viewing angle or illumination angle under a predominant directional light source is due to the angular dispersion of light according to wavelength in each of the orders of the diffracted beams. In contrast, diffuse light sources, such as ordinary room lights or light from an overcast sky, when used to illuminate the diffractive colorant or image, do not reveal much of the visual information contained in the diffractive colorant or image, and what is typically seen is only the colored or non-colored background reflection from the embossed surface.

There have been attempts to exploit the optical effects created by such devices by dispersing small fragments of diffractive particles in a transparent vehicle onto irregular printed surfaces. These efforts include a wide variety of diffractive structures that provide dispersion of visible light such that the viewer perceives a different color depending on the viewer orientation with respect to the diffractive surface or the illumination geometry. However, each structure heretofore created has its limitations, such as a glittery appearance that is aesthetically undesirable for many purposes.

For example, Spectratek Technologies Inc. of Los Angeles, Calif. produces a relatively large diffractive flake that produces particles that create varying colors depending on orientation of illumination or view. However, the large size of the flakes also contributes to a distinct sparkle, or "glittery" appearance. Thick flakes also tend to pile up on one another at high angles causing loss of chroma and color variations that act as glitter. Such flakes are described in U.S. Pat. No. 6,242,510, stating that: "[t]he unique ability of the prismatic platelets 18 to reflect light at many angles presents a constantly changing image as the line of site for the viewer is changed. The overall effect is best described as a myriad of small, bright reflections, similar to the radiant sparkle of crystals, crushed glass or even the twinkle of starlight." (Column 5, lines 56–62).

These particles are described in Spectratek's literature as having a minimum size of 50 by 50 microns. It is because of this relatively large size that they tend to be visible as individual particles. Additionally, because the flake thickness is about 12 microns, a micron particle has an aspect ratio of only about 4:1, and even a relatively large 100 micron particle has an aspect ratio of only about 8:1, thus precluding cooperative orientation with respect to each other and to a substrate. Despite the well recognized need for particulates smaller than 50 microns in many painting and printing methods, neither a reduction in particle size or increase in aspect ratio, i.e., greater than about 8:1, is commercially available. Analysis of these commercial flakes reveals they comprise a metallic foil protected by thick layers of plastic film. The metal layer forms the diffractive structure, which contains linear undulations at a spacing corresponding to about 1,700 to 1,800 lines per mm (ln/mm) with an undulation depth of about 140 nm.

In certain applications the continuous changes in color that can be achieved in a continuous foil form of diffraction grating are more preferred than has been heretofore achieved by flake based pigments. Conventional structures and methods of producing particles with diffractive gratings thereon have rendered such particles unsuitable for achieving the optical features achievable by foil structures. Heretofore, modifications of one structural parameter, while potentially beneficial to optical performance, inevitably have had an adverse impact on another critical characteristic. When the particles are large, disorientation results in a glittery effect. When the particles are small and not well oriented, the multiple colors are no longer distinct but tend to blend in appearance. Thus, even under highly collimated illumination the viewer perceives a washed out color range, rather than bright distinct colors characteristic of a continuous foil.

One attempt to provide more uniform colors, such as is required in color shifting security ink, is described in U.S. Pat. No. 5,912,767 to Lee (hereinafter "Lee"). Lee discloses that particles having a circular arrangement of the diffractive features, with grooves having a frequency of between 1,600 to 2,000 ln/mm (a groove width of 0.4 to 0.6 microns), are necessary to obtain a uniform appearance. In one preferred embodiment Lee discloses that one method of improving the uniformity of the color appearance is modulating the groove spacing with respect to the distance from the center of each particle. However, the circular grating structure is likely to suffer from very low brightness, due to the limited number of effective lines, which represent just a sub-region of very small 20 micron particles, as compared to particles of the same size having a simple linear grating type structure. Further, Lee has no teaching as to particle thickness or groove depth and no quantification of the performance that might provide a motivation to develop an efficient or economic method to produce such complex particles.

U.S. Pat. No. 6,112,388 to Kimoto et al. (hereinafter "Kimoto") teaches the use of inorganic dielectric layers to protect and stiffen a metallic foil. Kimoto requires a rather thick dielectric layer of 1 micron such that the final particle thickness is between about 2.5 and 3 microns. Since the desirable particle size is 25 to 45 microns, this results in an aspect ratio of between about 10:1 to 22:1. At the lower end of such an aspect ratio there is a greater preponderance for disorientation of the particles with respect to the surface of the coated or painted article, which coupled with the relatively large thickness results in a rougher outer surface. The rougher surface detracts from the appearance and is particularly problematic in many applications, such as automotive paint. Although a thicker top gloss coating may partially mask the roughness, it increases the cost and manufacturing cycle time. Increasing the particle size to improve the aspect ratio would make such particles too large for paint spray applications as well as increase the observable glitter effect. While such particles might be amenable to other painting or printing methods, the particles are highly fragile and friable because the thickness of the metal layer is insufficient to increase the fracture toughness of the inorganic material. Thus, the benefits of a higher aspect ratio may not be achievable in the resultant product.

Embossing metal flakes is one conventional approach to producing diffractive particles. However, the necessity of plastically deforming such flakes in order to obtain a permanent modulation height results in particles that do not have the necessary optical characteristics to produce bright distinct colors. For example, U.S. Pat. No. 6,168,100 to Kato et al. (hereinafter "Kato") discloses methods of embossing metal flakes with a diffractive relief pattern. FIG. 7 of Kato depicts an actual micrograph of flakes having a groove frequency measured to have about 1,300 ln/mm with a depth of about 800 nm. The flake appears corrugated in that the actual thickness of the metal layer, which is suggested to be within the range of 0.4 to 1 micron, is less than the groove depth. Since the optical performance requires a stable surface microstructure, the embossing process must plastically deform the metal foil, resulting in a significant groove depth in relationship to the foil thickness. While the resulting corrugated structure might be expected to remain flat transverse to the groove direction due to the stiffening effect of the grooves, the flake also appears to have a distinct curvature in the direction of the grooves.

Similarly, U.S. Pat. Nos. 5,549,774 and 5,629,068 to Miekka et al. disclose methods of enhancing the optical effects of colorants by the application of inks, such as metallic flake inks, metallic effect inks, or inks with pigments formed of optical stacks, upon embossed metallic leafing. These patents suggest that such embossed metallic leafing pigments should have a particle size between 10 to 50 microns for compatibility with painting or printing techniques. The frequency of the diffractive features in the case of linear grooves having a sinusoidal shape are disclosed as greater than about 600 ln/mm with a depth that should be less than about 500 nm.

U.S. Pat. Nos. 5,672,410, 5,624,076, 6,068,691, and 5,650,248 to Miekka et al. disclose a process for forming embossed thin bright metal particles with a metallic thickness of 10 to 50 nm. This is accomplished by metalizing an embossed release surface with aluminum. These patents suggest that the frequency of the diffractive features should be between 500 to 1,100 ln/mm and that the same process could be used to make multi-layer thin film optical stacks having the structure corresponding to an embossed carrier film or substrate. Embossment techniques are limited, however, with thin flakes because they can lead to undesirable flake deformation (curvature or departure from flatness) and/or fracture, thereby diminishing the angular resolution of the particulates as well as the overall brightness.

In summary, the conventional technology teaches various ways of making particulates having a diffraction grating type structure that collectively create some color dispersion when reconstituted and applied to the surface of an object. While the conventional diffractive microstructures produce a characteristic angular dispersion of visible light according to wavelength, other aspects of the particle microstructure and micromechanics favor an assembly of such particles having a less desirable glittery or sparkle appearance. This is shown in the final appearance of articles printed or painted with conventional particulates. Such printed or painted articles have an appearance which is apparently limited by the size, thickness and fragility of the particulates. The conventional diffractive microstructured particulates are all thus ineffective in providing an aesthetically pleasing paint, printed ink, or laminate that provides distinct color bands within a continuous rainbow on a curved surface.

SUMMARY OF THE INVENTION

The present invention relates to achromatic multilayer diffractive pigment flakes and foils, as well as diffractive compositions which incorporate the pigment flakes. The diffractive pigment flakes and foils have diffractive structures thereon, such as a diffraction grating pattern or a holographic image pattern, which are replicated from an underlying substrate with a diffractive structure on which the flakes or foils are formed. The diffractive pigment flakes and foils can be formed with a variety of diffractive structures thereon to produce selected optical effects.

In particular, the diffractive pigment flakes and foils can be fabricated to have specific diffractive surface microstructures along with physical and micro-mechanical attributes that provide enhanced optical effects. Depending on the desired optical effects, suitable grated microstructures are selected for the production of flakes and foils with the optimal diffractive effects. Such optical effects are created by the right combination of diffractive and reflective optics to produce, for example, strong, eye-catching optical effects that change and flash as the viewer changes position. In some embodiments, diffractive optical effects are visually perceived as an iridescent optical effect over an achromatic background such as a dark, low lightness background when the diffractive compositions or foils are applied to an object.

The diffractive pigment flakes can be formed to have a symmetrical stacked coating structure on opposing sides of a reflective core layer, an asymmetrical stacked coating structure on one side of a reflective layer, or can be formed with one or more encapsulating coatings around a reflective core layer. The diffractive pigment flakes can be interspersed into liquid media such as paints or inks to produce diffractive compositions for subsequent application to a variety of objects. The foils can be laminated to various objects or can be formed on a carrier substrate. The diffractive compositions and foils can be applied to a variety of objects to add unique decorative features as well as both visually perceptible and non-visually perceptible security features.

These and other features of the present invention will become more fully apparent from the following description and appended claims, or may be learned by the practice of the invention.

BRIEF DESCRIPTION OF THE DRAWINGS

In order to illustrate the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
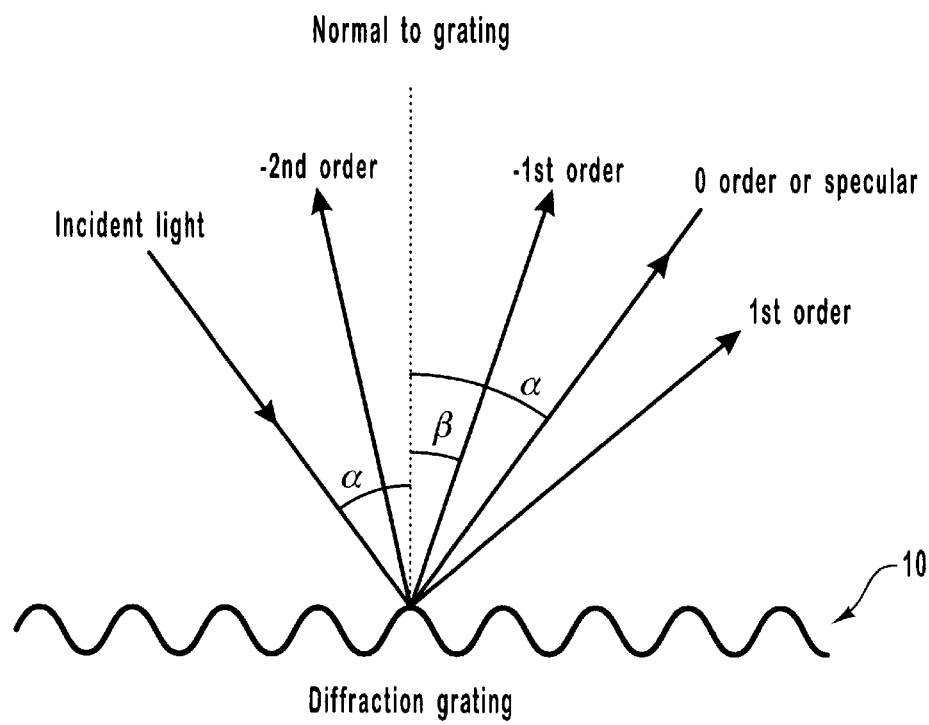
FIG. 1 is an illustration depicting the separation of polychromatic light into its component wavelengths by a diffraction grating.

The present invention is directed to achromatic multilayer diffractive pigment flakes and foils, as well as diffractive compositions which incorporate the pigment flakes. The diffractive pigment flakes and foils can be used to add unique decorative features to products, as well as both visually perceptible and non-visually perceptible security features to a variety of objects. The diffractive pigment flakes and foils have diffractive structures thereon, such as a diffraction grating pattern or a holographic image pattern, which are replicated from an underlying substrate with a diffractive structure on which the flakes or foils are formed. The diffractive pigment flakes and foils can be formed with a variety of diffractive structures thereon to produce selected optical effects.

The term "achromatic" as used herein refers to the substantial lack of background color or chroma produced by the pigment flakes or foils. Instead, the background of the pigment flakes and foils of the invention have a darker shade (e.g., black or gray) in their lightness characteristic without having any substantial chroma characteristics. Diffractive optical effects are visually perceived as an iridescent optical effect over the dark background when achromatic diffractive pigments or foils are applied to an object. For example, in some embodiments of the invention, the diffractive foils and diffractive compositions applied to an object exhibit an iridescent diffractive optical effect over an achromatic low lightness background such as a black or gray background produced by the diffractive foils or diffractive compositions.

It is well known that diffraction grating structures comprising highly reflective metal layers disperse incident radiation in the nonzero order diffracted beam, which indicates invisible light produces strong iridescent colors, with the color itself varying with the illumination angle and the observer position. This optical effect is best exploited for its decorative purposes when the incident radiation is highly directional, i.e., bright sunlight or spotlighting. In such a case, the observer will see a rainbow of colors surrounded by a silvery or bright metallic region. However, if the illumination is diffuse, arriving from many different angles rather than highly collimated, the bright metallic appearance will dominate. Not only is such metallic appearance of the highly reflective layer itself undesirable for some decorative purposes, it also permits a relatively minor amount of diffuse light to overwhelm the benefits of a collimated light source. That is, although a directional light source may be present, the color rainbows are only readily visible when the diffuse lighting is substantially eliminated.

One of the benefits of the present invention is the ability to achieve the full range of color characteristics of diffractive gratings for decorative purposes while at the same time avoiding a silvery or bright metallic appearance under other viewing or illumination conditions. The present invention also achieves the aforementioned aesthetic benefits in illumination conditions that include both collimated and diffuse lighting.

These and other advantages of the instant invention have been achieved by reducing the background reflectivity of a diffractive structure such that the color in diffuse lighting is a muted shade of gray rather than a bright metallic appearance. The background reflectivity is reduced by adding additional layers to the structure to modulate the intensity of light incident upon and radiating from the reflective layer, or by substituting a material that is not highly reflective. This produces a diffractive structure having a total average visual reflectivity of the background that is less than about 30% in diffuse lighting conditions. For example, a gray or neutral color appearance of the diffractive structure can be obtained by simultaneously reducing the reflectivity across the entire visible spectrum such that absolute reflectivity at a spectral wavelength range from about 400 nm to about 700 nm does not vary by more than about 20%.

A diffractive structure according to the invention, such as in a pigment flake or foil, comprises one or more reflective layers that are characterized by an average background reflectivity in diffuse lighting conditions that is less than about 30% in the visible spectrum (i.e., from about 400 nm to about 700 nm), and preferably less than about 20% in the visible spectrum. The variation in reflectivity from the average is preferably less than about 5 percent from about 400 nm to about 700 nm. A reflected color is observable in at least one of the higher order diffracted beams. The one or more reflective layers can comprise a material selected from a metal, a metal alloy, a metal compound, a semiconductor, and combinations thereof, with the material in its native form having a reflectivity of less than about 50%. In addition, one or more layers of a dielectric material can be disposed between the one or more reflective layers and a source of illumination.

In other embodiments, additional layers of a material selected from a metal, a metal alloy, a metal compound, a semiconductor, and combinations thereof, may also be present in the diffractive structure along with the one or more reflective layers. An absorbing layer disposed between the one or more reflective layers and a source of illumination can also be employed in the diffractive structure. The absorbing layer can be formed from one or more inorganic materials, or one or more organic dyes or dye compounds.

In a further embodiment, the one or more reflective layers are formed by the interface between a substantially transparent layer and another material, with the transparent layer and the other material having a substantial difference in refractive index. This embodiment can further comprise a substantially opaque absorbing layer, with the transparent layer being disposed between the opaque absorbing layer and a source of illumination.

The benefits of the instant invention can be achieved on any arbitrarily shaped article by application of a paint, ink or other surface coating or lamination having the present diffractive structures. The applied coating comprises a plurality of platelet shaped particles dispersed in a vehicle or binder wherein each such particle has the diffraction grating structure on at least one surface. The grating structure has a selected frequency, or pitch, and depth such that the zero order diffracted beam intensity is reduced and the first or higher order diffracted beam intensity is increased.

In some embodiments of the invention, the diffractive pigment flakes can have a symmetrical stacked coating structure on opposing sides of a reflective core layer, or can be formed with encapsulating coatings around the reflective core layer. The diffractive pigment flakes can be interspersed into liquid media such as paints or inks to produce diffractive compositions for subsequent application to a variety of objects. The diffractive foils can be laminated to various objects or can be formed on a carrier substrate. The diffractive pigment flakes and foils can be formed with a variety of diffractive structures thereon to produce selected optical effects.

Depending on the desired optical effects, suitable grated microstructures are selected for the production of the diffractive flakes and foils with the optimal diffractive effects. For example, the pigment flakes or foils can include a higher frequency diffractive grating microstructure such as a diffraction grating pattern having greater than about 1100 grating lines per mm (ln/mm) to create a wide range of optical effects.

In some embodiments of the invention, the diffractive flakes and foils provide strong eye-catching optical effects, the optical effects created by the right combination of diffractive and reflective optics that change and flash as the viewer changes position. Such eye-catching optical effects include iridescent effects, and can be used to create both decorative features as well as visually perceptible security features.

In other embodiments of the invention, covert security features can be provided in the diffractive pigment flakes. In such embodiments, the diffractive effects are only perceptible outside the visible wavelength range, such as in the ultraviolet (UV) or infrared (IR) wavelength ranges. This covert feature is produced by using gratings which only preferentially create diffractive effects in the UV or IR wavelength range. For example, at normal incidence, flakes with a grating frequency below about 500 ln/mm produce diffractive effects that are not perceptible in the visible spectrum to human eyes, but show diffractive effects in the wavelength range of about 800 nm to about 1600 nm, which is readable for an analytical instrument. Thus, a conventional IR detection apparatus can be configured to quickly and accurately detect the presence of such diffractive flakes, while the unaided human eye is unable to detect the presence of the diffractive structures.

The flakes of the invention can be formed to have a physical thickness of about 500 nm to about 2 microns (2,000 nm), preferably about 800 nm to about 1400 nm (1.4 microns). Although the flakes of the present invention are not of a uniform shape, the flakes can have an average particle size or "width" across the major surfaces thereof of about 50 microns or less, and preferably about 25 microns or less. The aspect ratio of flake width to flake thickness for the flakes of the invention is greater than about 2:1, preferably at least about 10:1, and more preferably at least about 25:1.

Depending on the materials used to form the inventive pigments, the diffractive structure or pigment may comprise one or more additional layers of sufficient modulus and thickness such that the flake-like particles are substantially rigid. When the aspect ratio of the substantially rigid particles is greater than about 2:1, such as about 5:1 or about 20:1, the pigment particles will preferentially align in a cooperative fashion such that a coated arbitrarily shaped article has an appearance substantially similar to a diffractive structure formed on a continuous sheet or foil.

In alternative embodiments, the diffractive structures of the invention can be formed on a continuous sheet or foil and then laminated or joined in conformity with an article to be decorated. The diffractive foils of the invention can be formed to have a physical thickness of from about 500 nm to about 3 microns, and preferably from about 800 nm to about 1200 nm.

The line frequency of the diffractive structure on the flakes or foils is preferably greater than about 1,200 ln/mm, such that light corresponding to the range of visible wavelengths in the first or higher order diffracted beams is substantially angularly separated from the same range of wavelengths in higher order diffracted beams when illuminated at normal incidence up to at least about 60 degrees from normal incidence. Additionally, the diffractive structure amplitude, which in a grating is the depth of the grooves, is such that the zero order diffracted beam is substantially suppressed in intensity so that the intensity of the higher order beams are enhanced over the desired range of wavelengths and/or angles of incidence. Accordingly, in one embodiment of the invention, the diffractive structure is a linear blazed (i.e., sawtooth shape) grating having a frequency of at least about 1,400 ln/mm and a groove depth of at least about 140 nm. In another embodiment of the invention, the diffractive structure is a linear sinusoidal grating having a frequency of at least about 2,000 ln/mm and a groove depth of at least about 100 nm.

The optimum aspect ratio and particle size for the flakes of the invention is preferably obtained by depositing multiple thin film layers on a substrate with a structured surface having a releasable intermediate coating layer such that appropriately sized flakes defoliate from the substrate surface replicating its shape. The diffractive flakes and foils of the invention can be formed using conventional thin film deposition techniques, which are well known in the art of forming thin coating structures. Nonlimiting examples of such thin film deposition techniques include physical vapor deposition (PVD), chemical vapor deposition (CVD), plasma enhanced (PE) variations thereof such as PECVD or downstream PECVD, sputtering, electrolysis deposition, and other like deposition methods that lead to the formation of discrete and uniform thin film layers. The physical and chemical vapor deposition methods provide for adequate replication of a smooth, relief varying substrate without the introduction of undesirable surface roughness.

In some embodiments, the diffractive pigment flakes are fabricated to have specific diffractive surface microstructures along with physical and micro-mechanical attributes that provide enhanced optical effects and which overcome the deficiencies in prior conventional diffractive pigments. In conventional diffractive particulate pigments, the reflected diffractive color is so highly sensitive to the viewing and illumination conditions that the diffractive particulate must possess previously mutually exclusive characteristics of: 1) a small particle size, stiffness and high aspect ratio to favor cooperative orientation of all the particulates substantially parallel to a coated article's surface, or other preferred orientation; 2) limitations in the angular range and/or intensity of characteristic diffractive color; and 3) enhancement of the brightness of the reflected diffractive color to overcome the inherent decrease arising from the small particle size. When other characteristics are optimized, simple linear grating structures on the flakes of the invention provide a greater brightness than more complicated variations in grating structure that have been suggested in the prior art, such as concentric or spatially modulated gratings.

Accordingly, the diffractive particulate preferably comprise rigid platelet or flake-like particles having at least one reflective layer containing a diffractive structure, such as a spatial modulation in height (with respect to a reference plane defined by the major axis of the platelet or flake). The flakes are substantially rigid due to either the mechanical properties of the reflective layer, a rigid transparent overcoating or a rigid central layer.

In one embodiment of the achromatic diffractive flakes, which produce a dark background with a diffractive effect, a transparent dielectric material, such as magnesium fluoride, can be deposited as a first layer and third layer to form stiffening protective layers over a second (central) opaque layer such as a layer of chromium. Alternatively, the first and third layers can form part of a contiguous dielectric layer substantially surrounding the central opaque layer. The $MgF_2$ layers are preferably each about 250 nm to about 450 nm thick, and the layer of chromium is preferably about 80 nm to about 160 nm thick. Such diffractive flakes have a total thickness of less than about 1,400 mn, and preferably have a thickness from about 500 nm to about 900 nm. In these flakes, the chromium layer has an intrinsically low reflectivity, and the optical thickness of the dielectric layers or their refractive index do not play an important role, since the dark background of the flakes is produced by the low reflectivity optical characteristics of the chromium layer. In other words, starting with a low reflectivity layer such as chromium, there is a large choice of thickness and dielectric materials that can be used to make dark, achromatic diffractive pigment flakes.

In a further embodiment of the invention, an achromatic diffractive flake includes a central layer comprising aluminum or chromium, with the central layer having a first major surface and an opposing second major surface. A layer of magnesium fluoride overlies each of the first and second major surfaces of the central layer, and each layer of magnesium fluoride has an optical thickness of about one quarter wave at a selected design wavelength. A chromium layer overlies each layer of magnesium fluoride, and an outer layer covers each of the chromium layers and has sufficient modulus of elasticity and thickness to render the diffractive pigment flake substantially rigid. The outer layers provide environmental protection to one or more of the interior layers of the flake. Preferably, the outer layers are substantially transparent and can be composed of a dielectric material such as magnesium fluoride.

Although the majority of the discussion herein is directed to diffractive gratings, it will be understood by those skilled in the art that holographic image patterns can be substituted for the gratings in many of the embodiments.

Diffractive Grating Design Technique

In one aspect of the invention, a design technique is provided which utilizes diffraction grating theory to select suitable microstructures for the fabrication of flakes or foils with desired diffractive properties. In this technique, various grating shapes can be modeled with conventional optical software to suppress and/or control the specular reflection intensity and spatial location of the diffractive orders to obtain an optimum grating design. Various grating shapes can be selected for modeling, such as triangular symmetrical, triangular blazed, square-wave with different top plateau sizes, and sinusoidal gratings with different groove frequencies and depth profiles. The modeling results can then be used to select grating substrates for the deposition of coating layers to form pigments and foils as described hereafter. Specific modeling results are set forth in the Examples section hereafter.

Diffraction grating theory indicates that the efficiency of the zero and successive orders can be optimized, thereby allowing for the production of grated flakes or foils having desired optical properties. These flakes or foils have diffractive optical properties that can be tailored depending on the final desired optical effect. Because the color of traditional pigments fades strongly at high view angles, diffractive effects can be introduced in addition to the combined refractive, reflective, absorbing, and the like optical properties of traditional pigments. As a result, diffractive pigments will create strong beams of diffracted light, even at high viewing angles.

Figure 2:
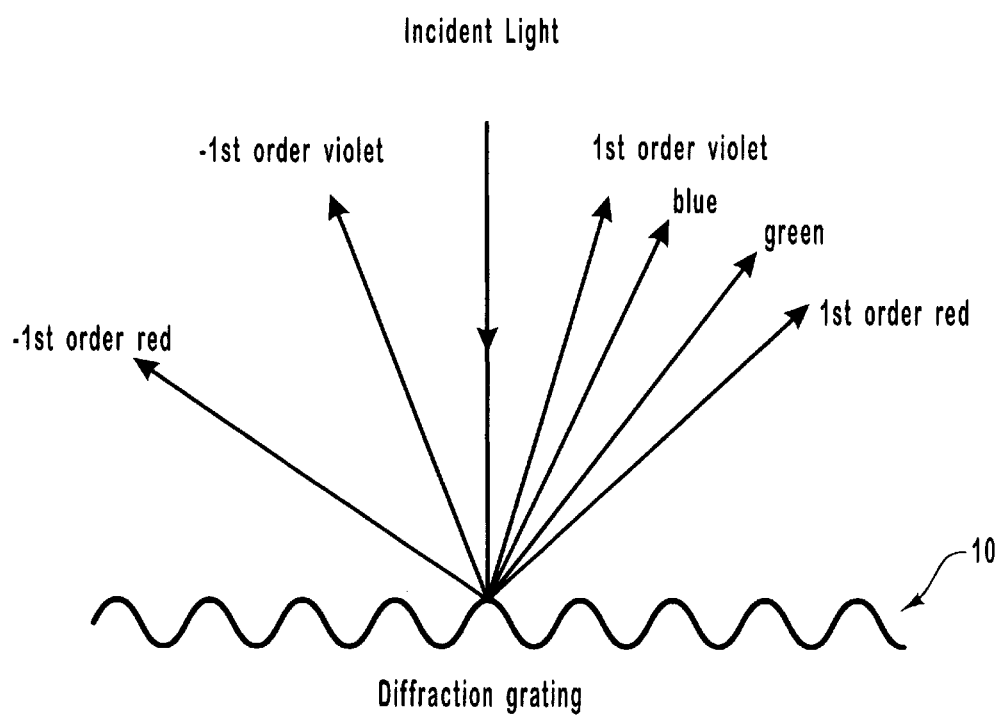
FIG. 2 is another illustration depicting the separation of polychromatic light into its component wavelengths by a diffraction grating.

FIGS. 1 and 2 are schematic depictions of the operation of a conventional diffraction grating 10 showing the separation (diffraction) of polychromatic light (white light) into its component wavelengths (rainbow). As illustrated in FIG. 1, light incident on a grating surface at an angle that is not normal to the surface creates a zero order or specular reflection that is a mirror effect color. The diffractive grating 10 creates a first order diffraction ($-1^{st}$ order and $1^{st}$ order) surrounding the zero order reflection. Similarly, a second order diffraction is created at higher angles than the first order diffraction.

FIG. 2 further illustrates the color effects that result from light incident on a diffractive surface. In this case the incident light is normal to the grating. First order colors corresponding to a rainbow of colors are produced at different angles surrounding the specular reflection.

For a unique set of discrete angles and for a given spacing "d" between grating peaks, the diffracted light from each facet of the grating is in phase with the light diffracted from any other facet, so they combine constructively, as described by Equation 1:

$$Gm\lambda = \sin \alpha + \sin \beta \quad \text{(equation 1)}$$

where $G=1/d$ is the groove density or pitch, $\alpha$ is the angle between the incident light and the normal to the grating, $\beta$ is the angle between the diffracted beam and the normal to the grating, and m is an integer called the diffraction order. For $m=0$, $\beta=-\alpha$ for all wavelengths ($\lambda$), and the grating acts as a mirror, with the wavelengths not being separated from each other. This is called specular reflection or zero order.

The angular dispersion is a measure of the angular spread $\partial \beta$ of a spectrum of order m between the wavelengths $\lambda$ and $\lambda + \partial \lambda$. It is defined as $\partial \beta / \partial \lambda = m/d \cos \beta$ and indicates that the closer the space between grooves (higher frequency), the stronger the angular dispersion. In other words, the angular separation between wavelengths increases for a given order m with higher groove frequencies.

For a given grating frequency, each successive order is wider (stronger angular dispersion), however, overlapping of the spectra will occur for lower frequency gratings. This also leads to target angular dispersion between orders. The closer the space between grooves, the farther apart will be the diffractive orders. In other words, the space between grooves of a grating determines the order separation.

A grating on a larger sized particle will improve the definition of the various orders, resulting in a better resolving power, since multiple grating lines are present on the particle. The resolving power R is a measure of the ability of a grating to separate adjacent spectral lines. For a planar diffraction grating, the resolving power is given by $R=mN$, where m is the diffraction order and N is the total number of grooves illuminated on the surface of the grating. Replacing Gm from Equation 1 with Nd, a more meaningful expression can be obtained:

$$R = Nd(\sin \alpha + \sin \beta)/\lambda \quad \text{(equation 2)}$$

where the quantity Nd is simply the grating width (W). As expressed by Equation 2, R is not dependent explicitly on the order or the number of grooves; these parameters are contained within the grating width and the angles of incidence and diffraction. The maximum attainable resolving power is then $R_{max}=2W/\lambda$. The degree to which the theoretical resolving power is attained depends also on the optical quality of the grating surface. In general, it is considered that any departure greater than $\lambda/10$ from flatness for a plane grating will result in a loss of resolving power.

P-polarization or TE polarized light is defined when the light is polarized parallel to the grating grooves, while S-Polarization or TM polarized light is polarized perpendicular to the grating grooves.

Equation 1 is applicable in the case that the incident and diffracted rays are perpendicular to the grooves (as normally positioned in spectroscopic instrumentation and termed in-plane diffraction). If the incident light is not perpendicular to the grooves, equation 1 has to be modified as:

$$Gm\lambda = \cos \epsilon (\sin \alpha + \sin \beta) \quad \text{(equation 3)}$$

where $\epsilon$ is the angle between the incident light path and the plane perpendicular to the grooves at the grating center. For geometries where $\epsilon$ is different than zero (azimuthal rotation of the grating), the diffracted spectra lie on a cone rather than in a plane, so such cases are termed conical diffraction.

In addition, for a given grating frequency, the depth of the grooves determines the relative intensity of the various orders.

The previous points related to diffraction grating theory can be used in modeling and designing appropriate diffraction grating structures for fabricating the flakes and foils of the invention. For example, the definition of the resolving power indicates that in the case of diffractive flakes, smaller flake particles will require a higher groove frequency. In addition, suppression and/or control of zero order effects and maximizing and/or minimizing the intensity to the first orders may accomplish enhancement of diffractive effects, while overlapping of the spectrum of successive orders may cause loss of diffractive effects.

Further, if a grating is azimuthally rotated about an axis perpendicular to the plane of the substrate, cones of the diffracted orders surrounding the specular reflection (zero order) will appear. In most flake-based pigment applications, the paint or ink medium includes an ensemble of small azimuthal pigment flakes that are randomly oriented. In the case of flakes with diffractive grating microstructures, the flake size and the random orientation are strong factors in the optical performance of the ensemble. Accordingly, diffractive pigment flakes in a random azimuthal orientation within a pigment medium such as a paint or ink create rings of diffracted light that are non-existent in non-diffractive flakes.

In addition, gratings work as well in reflection as in transmission in the case that the incident beam is perpendicular to the plane of the grating (P-polarization). Thus, complex light paths will occur in an optically variable or color shifting stack when diffractive structures are superimposed onto layers that function as reflectors, dielectrics, and absorbers.

As mentioned before, the amount of energy relative to the incident energy (efficiency) of gratings varies as a function of the type of grating and its groove depth. As a result the grating can be optimized for specific wavelengths through modeling. Thus, suitable diffraction grating structures for use in forming the flakes and foils of the invention can be selected which have specified line frequencies and groove depths so that the grating is optimized as desired. The grating frequency and depth is determined for a particular grating based upon the equations and considerations outlined hereinabove.

In some embodiments of the invention, a grating structure is utilized having a diffraction grating pattern with a frequency of from about 1000 to about 4000 grating ln/mm, preferably from about 1400 to about 3500 grating ln/mm, and more preferably from about 1400 to about 2000 grating ln/mm. Further, the gratings can have a groove depth of about 20 nm to about 300 nm, and preferably from about 100 nm to about 250 nm.

Various shaped gratings can be selected for the grating structures used in the present invention such as triangular symmetrical gratings, triangular blazed gratings, square-wave gratings, sinusoidal gratings, and the like. Alternatively, the grating can be a cross grating having perpendicular or non-perpendicular intersecting grooves, which create a line spectrum in different planes simultaneously.

Additional details related to the selection of appropriate grating structures are disclosed in copending U.S. patent application Ser. No. 09/919,346, filed on Jul. 31, 2001, the disclosure of which is incorporated by reference herein.

Figure 3:
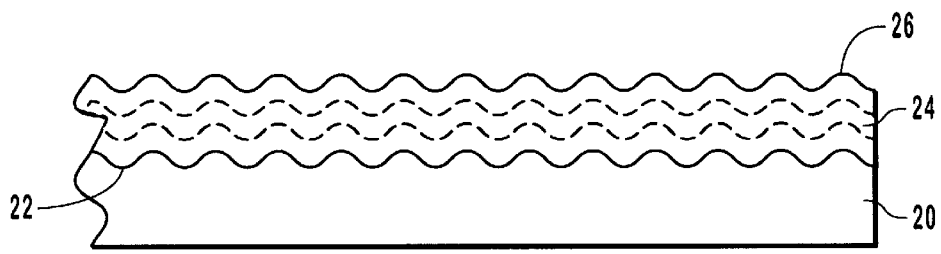
FIG. 3 is a schematic depiction of a web or foil grating which can be used to form the diffractive pigment flakes and foils of the invention.

Referring now to the drawings, wherein like structures are provided with like reference designations, the drawings only show the structures necessary to understand the present invention. FIG. 3 is a schematic depiction of web or foil diffractive grating 20 having a diffractive structure 22 on an upper surface thereof which can be used to form the diffractive pigment flakes or foils according to the invention. The grating line frequency and depth can be determined for a particular grating utilized based upon the equations and considerations set forth previously. For example, a diffraction grating can be employed so that a formed flake or foil will have a diffractive structure thereon with a pitch and amplitude selected to decrease the intensity of a zero order diffracted light beam in order to increase the intensity and color contrast of at least one higher order diffracted light beam. In one embodiment, the diffractive structure has a pitch of at least about 1,400 ln/mm and an amplitude modulation provided by a change in surface depth of at least about 140 nm. In a further embodiment, the diffractive structure can be about 3,000 ln/mm or less, and the change in surface depth can be about 220 nm or less.

A multiple layer coating 24 is formed on the upper surface of grating 20, such as by conventional deposition techniques, so that diffractive structure 22 is replicated in coating 24 which forms a thin film structure. As illustrated, coating 24 replicates the topography of grating 20 so that the grating peaks and channels are present on opposing surface 26 of coating 24. When the thin film structure of coating 24 is used to form flakes, coating 24 is subsequently fractured and removed from grating 20, such as by either dissolution in a solvent or by way of a release layer, to form a plurality of diffractive pigment flakes. The diffractive structure is formed on at least a portion of one or both of the major surfaces of the pigment flakes. When the thin film structure of coating 24 is used to form a foil, the thin film structure is applied to a non-release, diffractive grating substrate.

Coating 24 generally includes a reflector layer and one or more layers of a different material that has a substantially higher modulus of elasticity than the reflective material of the reflector layer, which increases the stiffness of a diffractive pigment flake. For example, a dielectric layer can be formed on one or both major surfaces of the reflector layer. The dielectric layer can be composed of a substantially transparent dielectric material. Additional layers such as an absorber layer can be formed on the dielectric layer.

The diffractive structure on the flakes or foils is capable of producing an angular separation of first and second order diffracted light beams such that there is no angular superposition of wavelengths from about 400 nm to about 800 nm within the first and second order diffracted light beams. The diffractive structure can also be characterized at normal incidence by a ratio of zero order intensity to first order intensity of at least about 0.25 and an angular separation between zero order and first order diffracted or reflected light beams of at least about 30 degrees.

The diffractive structure on the flakes or foils can be a diffraction grating pattern with at least about 1,400 ln/mm and a grating depth of at least about 140 nm. Preferably, the diffraction grating pattern can have from about 1400 to about 3500 ln/mm, with a grating depth from about 140 nm to about 230 nm. More preferably, the diffraction grating pattern can have from about 1400 to about 1700 ln/mm, and a grating depth from about 160 nm to about 220 nm.

The web or foil gratings utilized can be obtained from various commercial sources. In addition, the web or foil gratings can be produced from a thermoplastic film that has been embossed by heat softening the surface of the film and then passing the film through embossing rollers which impart a diffraction grating or holographic image onto the softened surface. In this way, sheets of effectively unlimited length can be formed with the diffraction grating or holographic image thereon. Alternatively, the diffractive structure on the web or foil can be made by passing a roll of plastic film coated with a UV curable polymer, such as polymethylmethacrylate (PMMA), through a set of UV transparent rollers whereby the rollers set a diffractive surface into the UV curable polymer and the polymer is cured by a UV light that passes through the UV transparent rollers. Other methods of forming an embossed surface on a substrate are disclosed in U.S. Pat. No. 5,549,774 to Miekka et al., which is incorporated by reference herein.

Diffractive Pigment Flakes

Figure 4:
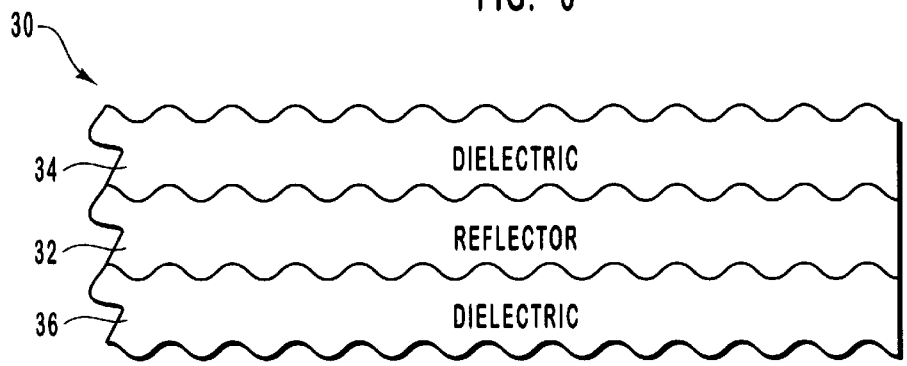
FIG. 4 is a schematic representation of the coating structure of a diffractive pigment flake according to one embodiment of the invention.

FIG. 4 depicts the coating structure of a diffractive flake 30 which has been produced from a multiple layer coating. The flake 30 can have a three layer design with a generally symmetrical thin film structure, including a central reflector layer 32 and opposing dielectric layers 34 and 36 on opposing major surfaces of reflector layer 32 but not on at least one side surface of the reflector layer. Alternatively, flake 30 can be formed with a two layer design, including reflector layer 32 and one of dielectric layers 34 or 36. The dielectric layers provide increased rigidity and durability to flake 30.

The reflector layer 32 can be composed of various reflective materials such as metals or metal alloys that have low reflectivity, although non-metallic reflective materials can also be used. Nonlimiting examples of suitable metallic materials include tin, titanium, palladium, nickel, cobalt, rhodium, niobium, chromium, tungsten, molybdenum, tantalum and compounds, combinations or alloys thereof. In this embodiment, the background lightness of the flakes will be provided by the intrinsic optical properties of the reflective material and the flakes will display a diffractive effect on the surfaces thereof.

The dielectric layers 34 and 36 can be composed of various dielectric materials, such as those having a refractive index from about 1.2 to about 4.5. Non limiting examples of suitable dielectric materials include magnesium fluoride, silicon dioxide, aluminum oxide, aluminum fluoride, cerium fluoride, lanthanum fluoride, neodymium fluoride, samarium fluoride, barium fluoride, calcium fluoride, lithium fluoride, and the like. Other suitable dielectric materials include zinc sulfide, zinc oxide, zirconium oxide, titanium dioxide, diamond-like carbon, indium oxide, indium-tin-oxide, tantalum pentoxide, ceric oxide, yttrium oxide, europium oxide, iron oxides such as (II)diiron(III) oxide and ferric oxide, hafnium nitride, hafnium carbide, hafnium oxide, lanthanum oxide, magnesium oxide, neodymium oxide, praseodymium oxide, samarium oxide, antimony trioxide, silicon, silicon monoxide, selenium trioxide, tin oxide, tungsten trioxide, and the like. Various mixtures or combinations of the above dielectric materials can also be employed.

The reflector layer 32 can have a physical thickness of from about 40 nm to about 200 nm, and preferably from about 80 nm to about 160 nm. The dielectric layers 34 and can each have a physical thickness of about 1 micron or less, preferably from about 200 nm to about 600 nm, and more preferably from about 250 nm to about 450 nm. The total thickness of flake 30 is less than about 1.5 microns, preferably less than about 1,400 nm, and more preferably from about 500 nm to about 900 nm.

In a method for fabricating a plurality of diffractive flakes corresponding to flake 30, the dielectric layers and reflector layer are deposited on the web or foil grating in a sequential manner according to the desired two layer or three layer flake design to form a multiple layer coating having a thin film structure. This thin film structure is subsequently fractured and removed from the grating to form a plurality of diffractive pigment flakes.

Figure 5:
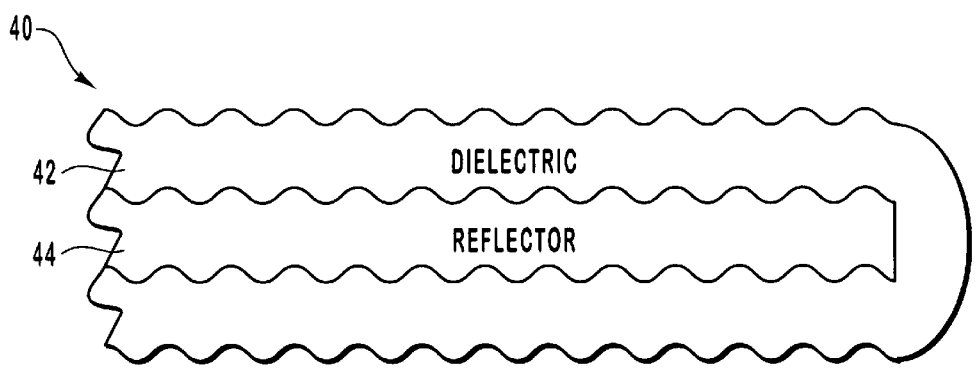
FIG. 5 is a schematic representation of the coating structure of a diffractive pigment flake according to another embodiment of the invention.

FIG. 5 depicts the coating structure of a diffractive flake 40 according to an alternative embodiment of the invention. The flake 40 has a two layer design with a contiguous dielectric layer 42 substantially surrounding and encapsulating a central reflector layer 44. The dielectric layer and reflector layer of flake 40 can be composed of the same materials and can have the same thicknesses as described previously for the corresponding layers in flake 30. The grating frequency and depth of the diffractive structure of flake 40 can be determined and formed as described hereinabove for flake 30.

In a method for fabricating a plurality of diffractive flakes corresponding to flake 40, one or more thin film layers including at least a reflective layer is deposited on a web or foil grating to form a diffractive thin film structure, which is subsequently fractured and removed from the grating to form a plurality of diffractive pigment preflakes corresponding to reflector layer 44. The preflakes can be fragmented further by grinding if desired. The preflakes are then coated with dielectric layer 42 in an encapsulation process to form a plurality of diffractive pigment flakes. When an encapsulation process is used, it will be appreciated that the encapsulating layer is a continuous layer composed of one material and having substantially the same thickness around the flake structure.

Figure 6:
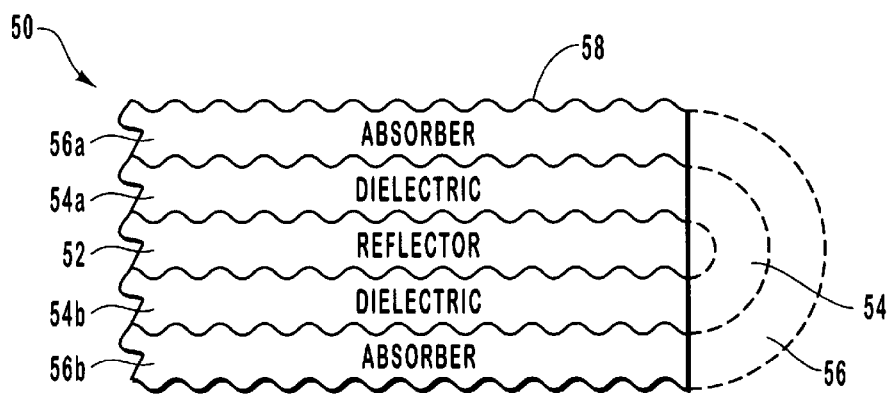
FIG. 6 is a schematic representation of the coating structure of a diffractive pigment flake according to further embodiments of the invention.

Referring now to FIG. 6, depicted is an achromatic multilayer diffractive pigment flake 50 according to another embodiment of the invention. The flake 50 has a generally symmetrical multilayer thin film structure having coating layers on opposing sides of a reflector layer 52. As illustrated, first and second dielectric layers 54a, 54b overlie opposing sides of reflector layer 52, and first and second absorber layers 56a, 56b overlie first and second dielectric layers 54a, 54b, respectively. A diffractive grating structure 58 is replicated in all of the layers of flake 50. The grating frequency and depth of diffractive grating structure 58 can be determined and formed as described hereinabove. The pigment flake 50 has an average reflectivity in diffuse lighting conditions of less than about 30%.

The coating design of pigment flake 50 in combination with the diffractive grating structure produces a background with a low level of lightness over which a diffractive optical effect is visually perceptible when the pigment is applied to an object. For example, the dielectric layers of flake 50 are formed with an optical thickness at a selected design wavelength such that a pigment composition including a plurality of flakes corresponding to flake 50 exhibits an iridescent diffractive effect over an achromatic background when applied to an object.

The reflector layer 52 of flake 50 can be composed of various reflective materials, such as those discussed previously with respect to reflector layer 32 of flake 30. In addition, reflector layer 52 can be composed of other reflective materials such as aluminum, silver, platinum, or any other material having high reflectivity in the visible spectrum. The reflector layer 52 can be formed to have a suitable physical thickness of from about 40 nm to about 200 nm, and preferably from about 80 nm to about 160 nm.

The dielectric layers 54a and 54b in flake 50 can be composed of various dielectric materials such as those discussed previously with respect to dielectric layers 34 and 36 of flake 30. The dielectric layers 54a and 54b in flake 50 are formed at a selected optical thickness to be thin enough to avoid imparting interference color and color shifting properties to the flake. The optical thickness is a well known optical parameter defined as the product $\eta d$, where $\eta$ is the refractive index of the layer and d is the physical thickness of the layer. Typically, the optical thickness of a layer is expressed in terms of a quarter wave optical thickness (QWOT) that is equal to $4\eta d/\lambda$, where $\lambda$ is the wavelength at which a QWOT condition occurs.

Accordingly, the optical thickness of each of the dielectric layers in flake 50 is about 2 QWOT or less at a selected design wavelength, such as about 400 nm or less, and preferably about 1 QWOT or less at a design wavelength of about 450 nm or less. The dielectric layers can have a physical thickness of from about 20 nm to about 100 nm, and preferably from about 40 nm to about 70 nm. The dielectric layers can each be composed of the same material or a different material, and can have the same or different optical or physical thickness for each layer.

The absorber layers 56a and 56b of flake 50 can be composed of any absorber material having the desired absorption properties, including materials that are uniformly absorbing or non-uniformly absorbing in the visible part of the electromagnetic spectrum. Thus, selective absorbing materials or nonselective absorbing materials can be used. For example, the absorber layers can be formed of nonselective absorbing metallic materials deposited to a thickness at which the absorber layer is at least partially absorbing, or semi-opaque.

Nonlimiting examples of suitable absorber materials for absorber layers 56a and 56b include metallic absorbers such as chromium, nickel, aluminum, silver, copper, palladium, platinum, titanium, vanadium, cobalt, iron, tin, tungsten, molybdenum, rhodium, and niobium, as well as corresponding metal oxides, metal sulfides, metal carbides, metal nitrides, and metal phosphides. Other suitable absorber materials include carbon, graphite, silicon, germanium, cermets, metals mixed in a dielectric matrix, and other substances that are capable of acting as a uniform or selective absorber in the visible spectrum. Various combinations, mixtures, compounds, or alloys of the above absorber materials may be used to form the absorber layers of flake 50.

Examples of suitable alloys of the above absorber materials include Inconel (Ni—Cr—Fe), stainless steels, Hastalloys (e.g., Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. As mentioned above, the absorber layers can also be composed of an absorbing metal oxide, metal sulfide, metal carbide, metal nitride, metal phosphide, or combination thereof. For example, one preferred absorbing sulfide material is silver sulfide. Other examples of suitable compounds for the absorber layers include titanium-based compounds such as titanium nitride (TiN), titanium oxynitride ($TiN_xO_y$), titanium carbide (TiC), titanium nitride carbide ($TiN_xC_z$), titanium oxynitride carbide ($TiN_xO_yC_z$), titanium silicide ($TiSi_2$), titanium boride ($TiB_2$), and combinations thereof. In the case of $TiN_xO_y$ and $TiN_xO_yC_z$, preferably x=0 to 1, y=0 to 1, and z=0 to 1, where x+y=1 in $TiN_xO_y$ and x+y+z=1 in $TiN_xO_yC_z$. For $TiN_xC_z$, preferably x=0 to 1 and z=0 to 1, where x+z=1. Alternatively, the absorber layers can be composed of a titanium-based alloy disposed in a matrix of Ti, or can be composed of Ti disposed in a matrix of a titanium-based alloy.

Depending on the absorption coefficient of the materials used, the absorber layers can be formed to have a physical thickness of from about 3 nm to about 50 nm, and preferably from about 5 nm to about 20 nm. The absorber layers can each be composed of the same material or a different material, and can have the same or different physical thickness for each layer.

A plurality of diffractive flakes corresponding to pigment flake 50 can be formed by a web coating process in which the various layers are sequentially deposited on a web material to form a thin film structure. This thin film structure is subsequently fractured and removed from the web to form a plurality of flakes.

FIG. 6 further shows an alternative coating structure (with phantom lines) for diffractive pigment flake 50, in which one or more of the absorber layers and dielectric layers are coated around reflector layer 52 in an encapsulation process. For example, when an encapsulation process is used to form the outer absorber layer, absorber layers 56a and 56b are formed as part of a contiguous absorbing coating layer 56 substantially surrounding the flake structure thereunder. Likewise, an encapsulation process can also be used in forming the underlying dielectric layer, such that dielectric layers 54a and 54b are formed as part of a contiguous dielectric coating layer 54 substantially surrounding the reflector layer 52.

Thus, diffractive pigment flake 50 may be embodied either as a multilayer thin film stack flake or a multilayer thin film encapsulated particle with one or more encapsulating layers therearound.

Various coating processes can be utilized in forming the dielectric and absorber coating layers by encapsulation. For example, suitable preferred methods for forming the dielectric layer include vacuum vapor deposition, sol-gel hydrolysis, CVD in a fluidized bed, downstream plasma onto vibrating trays filled with particles, and electrochemical deposition. A suitable $SiO_2$ sol-gel process is described in U.S. Pat. No. 5,858,078 to Andes et al., the disclosure of which is incorporated by reference herein. Other examples of suitable sol-gel coating techniques useful in the present invention are disclosed in U.S. Pat. No. 4,756,771 to Brodalla; Zink et al., *Optical Probes and Properties of Aluminosilicate Glasses Prepared by the Sol-Gel Method,* Polym. Mater. Sci. Eng., 61, pp. 204–208 (1989); and McKiernan et al., *Luminescence and Laser Action of Coumarin Dyes Doped in Silicate and Aluminosilicate Glasses Prepared by the Sol-Gel Technique,* J. Inorg. Organomet. Polym., 1(1), pp. 87–103 (1991); with the disclosures of each of these incorporated by reference herein.

Suitable preferred methods for forming the absorber layers include vacuum vapor deposition, and sputtering onto a mechanically vibrating bed of particles, as disclosed in U.S. Pat. No. 6,241,858 B1, entitled "Methods and Apparatus for Producing Enhanced Interference Pigments," which is incorporated by reference herein. Alternatively, the absorber layers may be deposited by decomposition through pyrolysis of metal-organo compounds or related CVD processes which may be carried out in a fluidized bed as described in U.S. Pat. Nos. 5,364,467 and 5,763,086 to Schmid et al., the disclosures of which are incorporated by reference herein. If no further grinding is carried out, these methods result in an encapsulated core flake section with dielectric and absorber materials therearound. Various combinations of the above coating processes may be utilized during manufacture of pigment flakes with multiple encapsulating coatings. Suitable absorber materials can be applied as either a single material or as an outer capping layer over an underlying different absorber material if desired.

In an alternative embodiment of the invention, asymmetrical diffractive flakes can be provided which include a thin film stack structure with the same layers as on one side of reflector layer 52 of flake 50 as shown in FIG. 6. Accordingly, the asymmetrical flakes include, for example, a reflector layer, a dielectric layer overlying the reflector layer, and an absorber layer overlying the dielectric layer. Each of these layers can be composed of the same materials and can have the same thicknesses as described above for the corresponding layers of flake 50. In addition, the asymmetrical flakes can be formed by a web coating process in which the various layers are sequentially deposited on a web material to form a thin film structure, which is subsequently fractured and removed from the web to form a plurality of flakes.

The asymmetrical diffractive flakes can be dispersed in a pigment medium to produce a diffractive composition that is lighter than a diffractive composition containing only symmetrical diffractive flakes such as flake 50. This results from some of the asymmetrical flakes being positioned in the diffractive composition with their reflector layer facing the outside so as to provide some light reflection within the composition. In addition, both symmetrical and asymmetrical diffractive flakes can be dispersed in a pigment medium together in varying amounts to produce a diffractive composition having a certain level of lightness.

Figure 7:
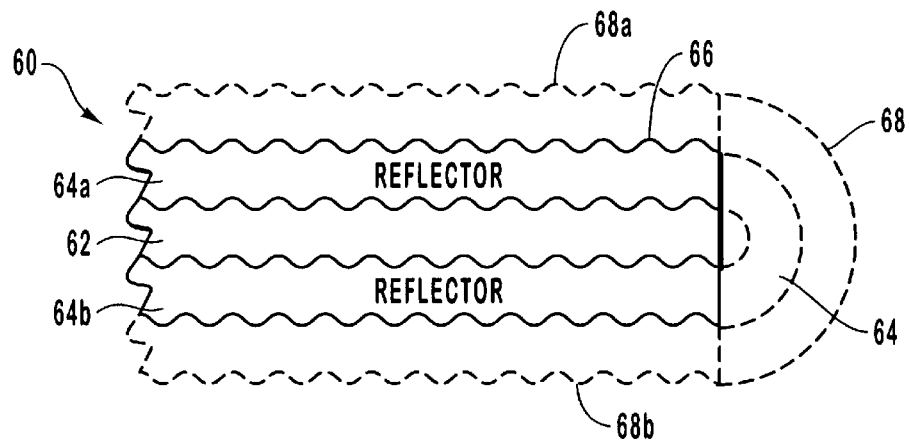
FIG. 7 is a schematic representation of the coating structure of a diffractive pigment flake according to additional embodiments of the invention.

Referring now to FIG. 7, a diffractive pigment flake 60 is depicted according to another embodiment of the invention. The flake 60 includes a central dielectric support layer 62 with first and second reflector layers 64a and 64b on opposing major surfaces thereof. By inserting the dielectric layer between the reflector layers, the flake 60 is significantly stabilized and strengthened, having increased rigidity.

The reflector layers 64a and 64b can be formed of any of the reflector materials described previously and at the same thickness ranges described previously such as for reflector layer 32. The flake 60 has a diffractive structure 66 formed on at least one surface thereof. The grating frequency and depth of diffractive structure 66 can be determined and formed as described hereinabove.

A plurality of diffractive flakes corresponding to pigment flake 60 can be formed by a web coating process in which the various layers are sequentially deposited on a web material to form a thin film structure. This thin film structure is subsequently fractured and removed from the web to form a plurality of flakes.

The flake 60 can be used as a pigment flake by itself or can be used as a reflector core section with one or more additional layers 68a, 68b applied thereover. For example, additional dielectric layers may optionally be added to overlie reflector layers 64a and 64b. These additional dielectric layers can add durability, rigidity, and environmental resistance to flake 60.

The additional layers 68a, 68b can also include dielectric layers such as those described for flake 50, which are formed to be thin enough to avoid imparting interference color effects to the flake, and absorber layers thereover such as those described for flake 50. As described previously, such a coating structure produces a background with a low level of lightness over which a diffractive optical effect is visually perceptible.

The additional layers 68a, 68b can be formed as part of the web coating process in which the various layers are sequentially deposited on a web material and released to form a thin film stack flake structure. Alternatively, one or more of the additional layers 68a, 68b, such as a dielectric layer and an absorber layer, can be formed as part of a contiguous coating layer 68 substantially surrounding the flake structure thereunder in an encapsulation process.

The dielectric material used for support layer 62 is preferably inorganic, since inorganic dielectric materials have been found to have good characteristics of brittleness and rigidity. Various dielectric materials that can be utilized include metal fluorides, metal oxides, metal sulfides, metal nitrides, metal carbides, combinations thereof, and the like. The dielectric materials may be in either a crystalline, amorphous, or semicrystalline state. These materials are readily available and easily applied by physical or chemical vapor deposition processes, or other wet chemical processes such as sol-gel coating.

Non-limiting examples of suitable dielectric materials for support layer 62 include magnesium fluoride, silicon monoxide, silicon dioxide, aluminum oxide, titanium dioxide, tungsten oxide, aluminum nitride, boron nitride, boron carbide, tungsten carbide, titanium carbide, titanium nitride, silicon nitride, zinc sulfide, glass flakes, diamond-like carbon, combinations thereof, and the like. Alternatively, support layer 62 may be composed of a preformed dielectric or ceramic preflake material having a high aspect ratio such as synthetic platelets formed form glass, alumina, silicon dioxide, carbon, micaeous iron oxide, coated mica, boron nitride, boron carbide, graphite, bismuth oxychloride, various combinations thereof, and the like.

In an alternative embodiment, instead of a dielectric support layer, various semiconductive and conductive materials having a sufficient ratio of tensile to compressive strength can function as a support layer. Examples of such materials include silicon, metal silicides, semiconductive compounds formed from any of the group III, IV, or V elements, cermet compositions or compounds, semiconductive glasses, various combinations thereof, and the like. It will be appreciated from the teachings herein, however, that any support material providing the functionality described herein and capable of acting as a rigid layer with glass-like qualities would be an acceptable substitute for one of these materials.

The thickness of support layer 62 can be in a range from about 10 nm to about 1,000 nm, and preferably from about 50 nm to about 200 nm, although these ranges should not be taken as limiting.

Alternatively, flake 60 can be formed as an encapsulated particle, as illustrated by the phantom lines in FIG. 7. The particle can be a two layer design with a reflector layer 64 substantially surrounding and encapsulating support layer 62. The encapsulated particle can be used as a pigment particle by itself or can be used as a diffractive core section with one or more additional coating layers 68 applied thereover. For example, an outer dielectric layer may be added to overlie and encapsulate reflector layer 64. This outer dielectric layer adds durability, rigidity, and environmental resistance to the encapsulated particle. The additional layers 68 can also include dielectric layers such as those described for flake 50, and absorber layers thereover. As discussed previously, such as coating structure produces a background with a low level of lightness over which a diffractive optical effect is visually perceptible.

Various modifications and combinations of the foregoing embodiments are also considered within the scope of the invention. For example, additional dielectric, absorber, and/or other optical coatings can be formed around each of the above flake embodiments, or on a composite reflective film prior to flake formation, to yield further desired optical characteristics. Such additional coatings can provide enhanced optical effects to the pigments.

Preferably, the flakes of the invention have a thickness of less than about 3 $\mu$m, more preferably less than about 2 $\mu$m. As to length and width, each flake will have a different dimension due to the fracturing process used to form the flakes. However, the median flake size, width and length, is preferably from about 5 $\mu$m to about 200 $\mu$m, more preferably from about 5 $\mu$m to about 100 $\mu$m, and most preferably from about 16 $\mu$m to about 22 $\mu$m.

Because the diffractive effects produced by the pigment flakes of the invention are totally geometrical, the diffractive colors are independent of the physical-chemical causes of the production of the background color of the flakes. The background color is produced by distinct causes, such as transitions involving excitation of electrons resulting in fluorescence, phosphorescence, and the like. In addition, the background color can be caused by transitions between molecular orbitals, such as in the case of most dyes, or by transitions involving energy bands in materials such as metals, semiconductors, color centers, and the like.

The degree of visible diffractive effects varies with the grating frequency. For example, paints with flakes having a 500 ln/mm frequency lose the visual diffractive effects while diffractive effects are enhanced for flakes with higher frequencies such as 1400 or 2000 ln/mm. In fact, grating microstructure frequencies of up to about 3000 ln/mm can be achieved on flakes obtained from multi-layer optical stacks. The optical effects produced by the flakes can be tailored depending on the geometrical microstructure of the flakes.

Diffractive Compositions

The diffractive pigment flakes of the present invention can be interspersed within a pigment medium to produce a diffractive composition such as an ink, paint, or the like, which can be applied to a wide variety of objects or papers. The pigment flakes can also be dispersed within a pigment medium such as a plastic material which can be molded or extruded to form an object which has diffractive effects. The pigment flakes can also be dispersed within a pigment medium such as a cosmetic formulation or automotive paints.

The diffractive pigment flakes added to a pigment medium produces a predetermined optical response through radiation incident on a surface of the solidified medium. Preferably, the pigment medium contains a resin or mixture of resins which can be dried or hardened by thermal processes such as thermal cross-linking, thermal setting, or thermal solvent evaporation or by photochemical cross-linking. Useful pigment media include various polymeric compositions or organic binders such as alkyd resins, polyester resins, acrylic resins, polyurethane resins, vinyl resins, epoxies, styrenes, and the like. Suitable examples of these resins include melamine, acrylates such as methyl methacrylate, acrylonitrile butadiene stryrene (ABS) resins, ink and paint formulations based on alkyd resins, and various mixtures thereof. The flakes combined with the pigment media produce a diffractive composition that can be used directly as a paint, ink, or moldable plastic material. The diffractive composition can also be utilized as an additive for conventional paint, ink, or plastic materials.

The pigment medium also preferably contains a solvent for the resin. For the solvent, generally, either an organic solvent or water can be used. A volatile solvent can also be used in the medium. As for the volatile solvent, it is preferable to use a solvent which is both volatile as well as dilutable, such as a thinner. In particular, faster drying of the pigment medium can be achieved by increasing the amount of the solvent with a low boiling point composition such as methyl ethyl ketone (MEK).

In addition, the diffractive flakes of the invention can be optionally blended with various additive materials such as conventional non-diffractive pigment flakes, particles, or dyes of different hues, chroma and brightness to achieve the color characteristics desired. For example, the flakes can be mixed with other conventional pigments, either of the interference type or noninterference type, to produce a range of other colors. This preblended composition can then be dispersed into a polymeric medium such as a paint, ink, plastic or other polymeric pigment vehicle for use in a conventional manner.

Examples of suitable additive materials that can be combined with the flakes of the invention include non-color shifting high chroma or high reflective platelets which produce unique color effects, such as $MgF_2/Al/MgF_2$ platelets, or $SiO_2/Al/SiO_2$ platelets. Other suitable additives that can be mixed with the diffractive flakes include lamellar pigments such as multi-layer color shifting flakes, aluminum flakes, graphite flakes, glass flakes, iron oxide, boron nitride, mica flakes, interference based $TiO_2$ coated mica flakes, interference pigments based on multiple coated plate-like silicatic substrates, metal-dielectric or all-dielectric interference pigments, and the like; and non-lamellar pigments such as aluminum powder, carbon black, ultramarine blue, cobalt based pigments, organic pigments or dyes, rutile or spinel based inorganic pigments, naturally occurring pigments, inorganic pigments such as titanium dioxide, talc, china clay, and the like; as well as various mixtures thereof. For example, pigments such as aluminum powder or carbon black can be added to control lightness and other color properties.

The achromatic diffractive pigment flakes of the present invention can also be blended with other diffractive flakes, such as the high reflectivity achromatic diffractive flakes disclosed in copending U.S. application Ser. No. 09/919,346, filed on Jul. 31, 2001, the disclosure of which was previously incorporated by reference herein. The achromatic pigment flakes of the invention can also be blended with various chromatic diffractive pigment flakes. These additional diffractive flakes that can be blended with the flakes of the invention may have a symmetrical or asymmetrical flake layer structure for either the chromatic or high reflectivity achromatic diffractive flakes.

The pigment flakes of the invention can be easily and economically utilized in paints and inks which can be applied to various objects or papers, such as motorized vehicles, currency and security documents, household appliances, architectural structures, flooring, fabrics, sporting goods, electronic packaging/housing, product packaging, beverage containers, and the like. The flakes can also be utilized in forming colored plastic materials, coating compositions, extruded parts, electrostatic coatings, glass, and ceramic materials.

The diffractive pigment flakes can have a preselected size and loading in the pigment medium to produce an ink suitable for use in a printing process such as intaglio, lithography, silk screen, gravure, doctor blade, and wet coating. The diffractive pigment flakes are also suitable for dispersion in conventional paint vehicles or resins such as those compatible with conventional painting methods, particularly for painting motorized vehicles or other structures requiring a base, middle, top coat, and the like. The diffractive pigments are also suitable for decorative application in cosmetic formulations, laminating films, and the like.

A coated article according to the invention includes an object having a surface, and a diffractive coating layer overlying at least a portion of the surface. The coating layer comprises a diffractive composition including a pigment medium as described previously, and a plurality of diffractive pigment flakes dispersed in the pigment medium. The coated article can further include a base coating layer, which can include a precoat, a prime coat, and/or a sealer coat, applied to an object prior to applying the diffractive coating layer. A transparent top coating layer such as a clear coat can be applied over the diffractive coating layer. Such a coating layer structure would typically be produced in painting a motor vehicle such as an automobile. Further details of such a coating layer structure are set forth in U.S. Pat. No. 5,571,624 to Phillips et al., which is incorporated by reference herein.

Figure 8A:
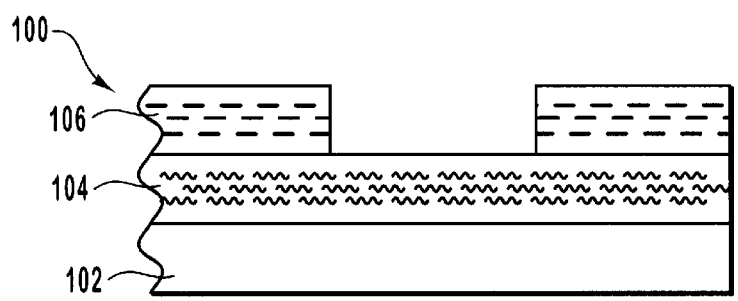
FIGS. 8A and 8B are schematic representations of multi-coated articles wherein one of the coating layers incorporates diffractive pigment flakes and the other coating layer has non-diffractive flakes.
Figure 8B:
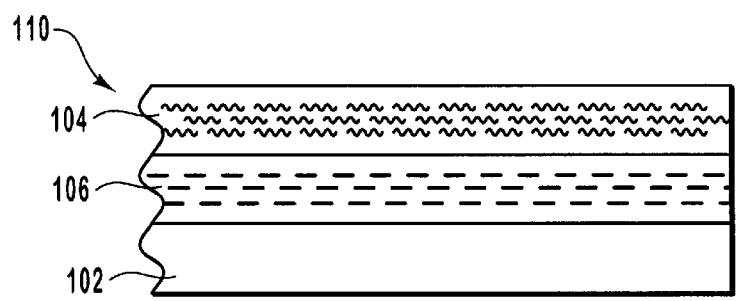

Alternatively, the coated article can further include a non-diffractive coating layer under the diffractive coating layer, or a non-diffractive coating layer partially overlying the diffractive coating layer, thereby forming a diffractive pattern on the object. Such coating structures are illustrated in FIGS. 8A and 8B, which show a multi-coating application where one of the coating layers incorporates diffractive flakes according to the invention and the other coating layer has non-diffractive flakes. For example, FIG. 8A shows a coated article 100 including a surface section 102 having a diffractive coating layer 104 thereon. A non-diffractive coating layer 106 partially overlies diffractive coating layer 104, thereby producing a diffractive pattern which follows the exposed surface of diffractive coating layer 104. FIG. 8B depicts a coated article 110 with an opposite coating configuration, in which a diffractive coating layer 104 overlies a non-diffractive coating layer 106.

Figure 9:
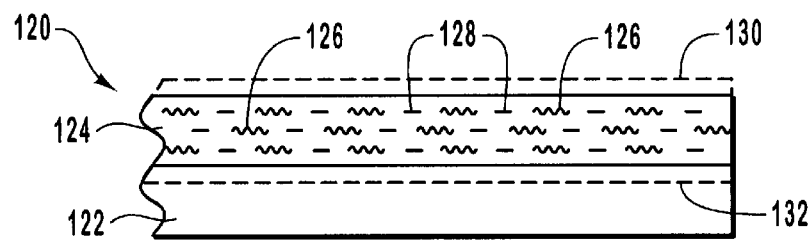
FIG. 9 is a schematic representation of a coated article having at least one coating layer which includes diffractive flakes and optionally non-diffractive flakes.

In yet a further embodiment, the coated article can comprise a single coating layer with diffractive flakes dispersed therein. Optionally, non-diffractive flakes can also be dispersed in the coating layer with the diffractive flakes. For example, FIG. 9 depicts a coated article 120 including a surface section 122 having a coating layer 124 thereon. The coating layer 124 includes a plurality of diffractive flakes 126 and optional non-diffractive flakes 128 interspersed in a pigment medium. Optionally, if desired for a specific application, a transparent top coating layer 130 can be applied over coating layer 124, and a base coating layer 132 can be applied to surface section 122 prior to applying coating layer 124.

A printed or irregularly shaped object having a diffractive pigment coating or coloration has the appearance of having a continuous holographic or diffraction grating foil on the object such that the dominant coloration of a region of the object is a function of the juxtaposition of the illumination source and the viewer. The diffractive compositions of the invention applied to an object also produce a substantially continuous tone iridescent diffractive effect. The compositions also produce a substantially uniform and continuous color range observable under a mixture of diffuse and specular or directional illumination when applied to a curved object.

The achromatic diffractive pigment flakes are suitable for providing additional forgery and photocopy proof features on security documents as well as authentication features on high value and/or critical parts and supplies. For example, the pigment flakes can be used to form an optical security device comprising a first region, a second region, and an assembly of the pigment flakes in at least one of the first or second regions. The pigment flakes have a diffractive structure comprising a sequence of substantially equally spaced linear features that provides for a decrease in a zero order diffracted light beam and a sufficient increase in a first or higher order diffracted light beam such that the appearance of the security device is dominated by the dispersion of light by first or higher order reflections.

Diffractive Foils

Figure 10:
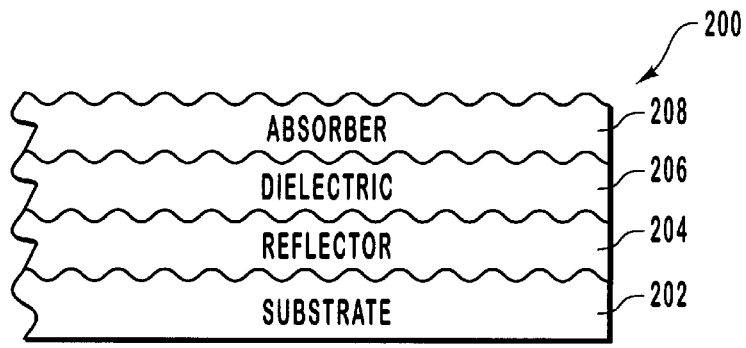
FIG. 10 is a schematic representation of the coating structure of a diffractive foil according to one embodiment of the invention.

Referring now to FIG. 10, the coating structure of an achromatic diffractive foil 200 is depicted. The diffractive foil 200 is formed on a substrate 202, which can be any suitable material, such as a flexible PET web, carrier substrate, or other plastic material, on which a diffractive structure is formed such as a diffraction grating pattern or a holographic image pattern. A suitable thickness for substrate 202 is, for example, about 0.5 to about 7 mils.

The diffractive foil 200 includes a reflector layer 204 overlying substrate 202, a dielectric layer 206 overlying reflector layer 204, and an absorber layer 208 overlying dielectric layer 206. The reflector, dielectric, and absorber layers of diffractive foil 200 can be composed of the same materials and can have the same thicknesses as described above for the corresponding layers in flakes 30 and 50. For example, the dielectric layer 206 can have an optical thickness of about 2 QWOT or less at a selected design wavelength, and preferably about 1 QWOT or less at a selected design wavelength, such as a design wavelength of about 450 nm or less. The diffractive foil 200 exhibits an iridescent diffractive effect over an achromatic background such as a dark, low lightness background.

The diffractive foil 200 can be formed by a web coating process, with the various layers as described above sequentially deposited on a web having a diffractive structure thereon. The various layers can be deposited by conventional CVD or PVD deposition techniques over the diffractive structure on the web to form a thin film foil that has the diffractive structure replicated in the layers of the foil. The diffractive foil 200 can be formed on a carrier substrate, which can be a web without a release layer. Alternatively, foil 200 can be formed on a release layer of a web so that the foil can be subsequently removed and attached to a surface of an object.

Figure 11:
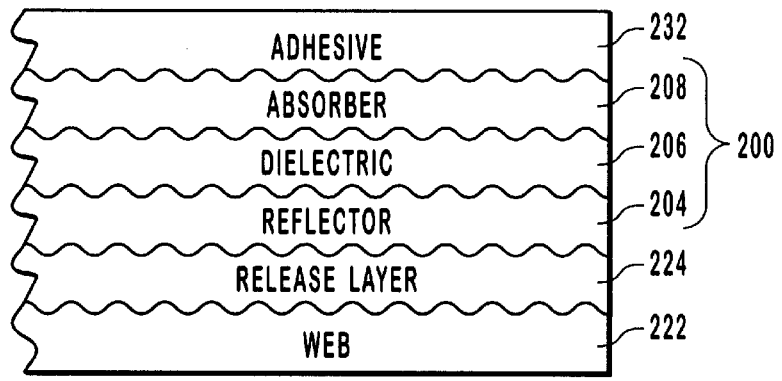
FIGS. 11 and 12 are alternative schematic configurations of diffractive foils according to the invention formed on a web.

For example, FIG. 11 depicts diffractive foil 200 formed on a web 222 having a diffractive structure with an optional release layer 224 thereon. The reflector layer 204 is deposited over the optional release layer 224, followed by the deposition of dielectric layer 206 and absorber layer 208. The foil 200 may be utilized attached to web 222 as a carrier when a release layer is not employed. Alternatively, foil 200 may be laminated to a transparent substrate (not shown) via an optional adhesive layer 232, such as a transparent adhesive or ultraviolet (UV) curable adhesive, when the release layer is used. The adhesive layer 232 can be applied over absorber layer 208 and/or the transparent substrate prior to lamination.

Figure 12:
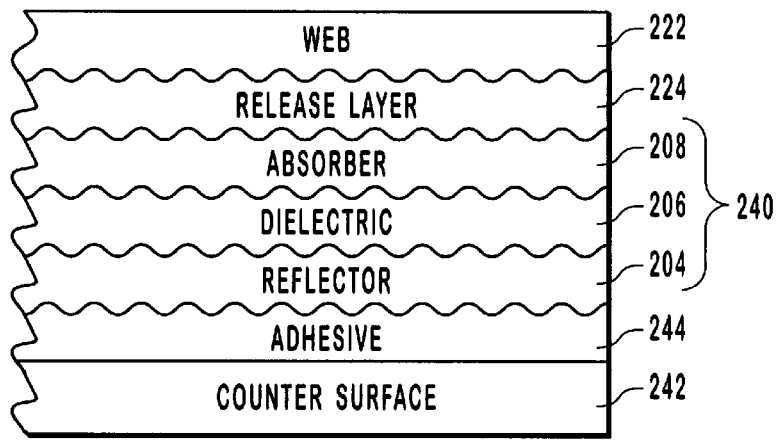

Referring now to FIG. 12, depicted is an alternative embodiment in which an achromatic diffractive foil 240, having the same thin film layers as foil 200, is formed on a web 222 having a diffractive structure and an optional release layer 224 thereon. The foil 240 is formed such that an absorber layer 208 is deposited on web 222, followed by the deposition of a dielectric layer 206 and a reflector layer 204. The foil 240 may be utilized attached to web 222 as a carrier, which is preferably transparent, when a release layer is not employed. The foil 240 may also be attached to a substrate such as a countersurface 242 when the release layer is used, via an adhesive layer 244 such as a hot stampable adhesive, a pressure sensitive adhesive, a permanent adhesive, and the like. The adhesive layer 244 can be applied over reflector layer 204 and/or countersurface 242.

When a hot stamp application is employed, the optical stack of the foil is arranged so that the optically exterior surface is adjacent the release layer. Thus, for example, when foil 240 in FIG. 12 is released from web 222, absorber layer 208 is optically present on the exterior of countersurface 242. In one preferred embodiment, release layer 224 is a transparent hardcoat that stays on absorber layer 208 to protect the underlying layers after transfer from web 222. Further details of making and using optical stacks as hot stamping foils can be found in U.S. Pat. Nos. 5,648,165, 5,002,312, 4,930,866, 4,838,648, 4,779,898, and 4,705,300, the disclosures of which are incorporated by reference herein.

Other Diffractive Flake and Foil Embodiments

Figure 13:
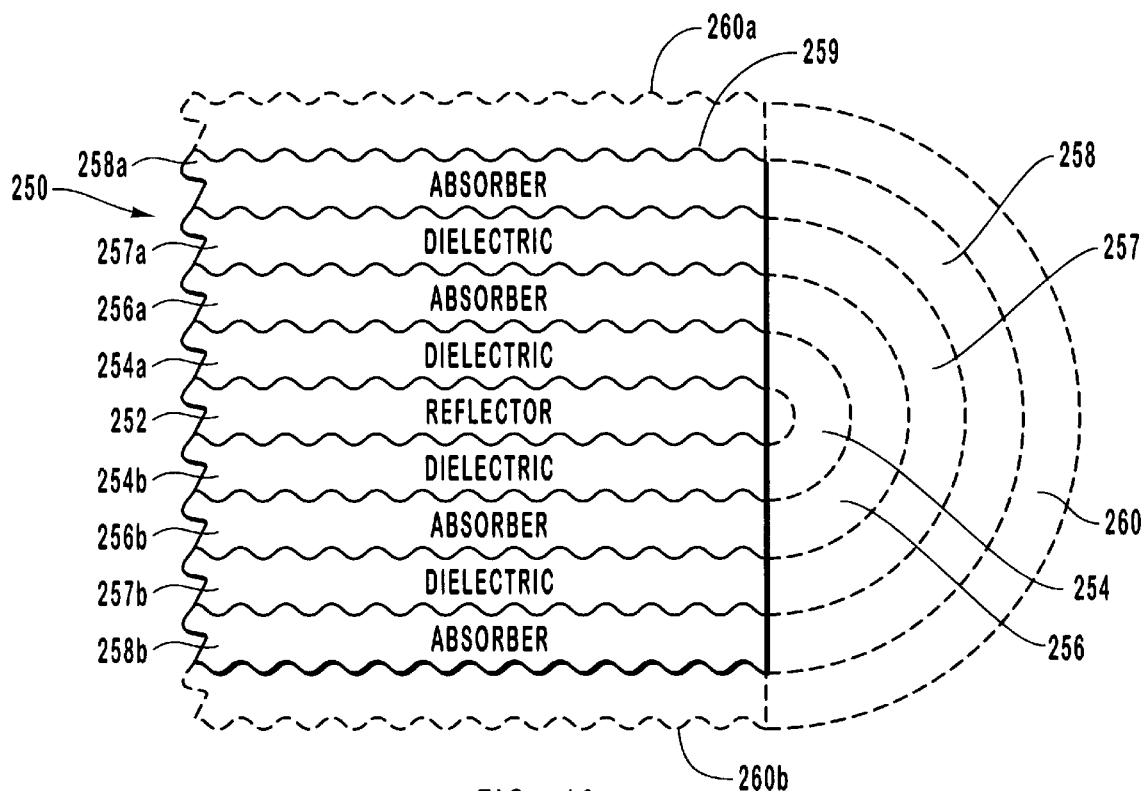
FIG. 13 is a schematic representation of the coating structure of a diffractive pigment flake according to additional embodiments of the invention.

In another embodiment of the present invention shown in FIG. 13, a dark visible appearance is created in a diffractive flake 250 using an alternative interference coating structure. The flake 250 has a generally symmetrical multilayer thin film structure having coating layers on opposing sides of a reflector layer 252. As illustrated, first and second dielectric layers 254a, 254b overlie opposing sides of reflector layer 252, and first and second absorber layers 256a, 256b overlie first and second dielectric layers 254a, 254b, respectively. Still further, third and fourth dielectric layers 257a, 257b overlie first and second absorber layers 256a, 256b, respectively. Finally, third and fourth absorber layers 258a and 258b overlie third and fourth dielectric layers 257a, 257b, respectively. A diffractive grating structure 259 is replicated in all of the layers of flake 250. The grating frequency and depth of diffractive grating structure 259 can be determined and formed as described hereinabove.

A plurality of diffractive flakes corresponding to pigment flake 250 can be formed by a web coating process in which the various layers are sequentially deposited on a web material having a diffractive structure thereon to form a thin film structure. This thin film structure is subsequently fractured and removed from the web to form a plurality of flakes.

FIG. 13 further shows an alternative coating structure (with phantom lines) for diffractive pigment flake 250, in which one or more of the absorber layers and dielectric layers are coated around reflector layer 252 in an encapsulation process. For example, when an encapsulation process is used to form the outer absorber layer, absorber layers 258*a* and 258*b* are formed as part of a contiguous absorbing coating layer 258 substantially surrounding the flake structure thereunder. Likewise, an encapsulation process can also be used in forming the underlying dielectric layer, such that dielectric layers 257*a* and 257*b* are formed as part of a contiguous dielectric coating layer 257 substantially surrounding the underlying layers. An encapsulation process can also be used to form the underlying absorber layers 256*a* and 256*b* as part of a contiguous absorbing coating layer 256, and to form the underlying dielectric layers 254*a* and 254*b* as part of a contiguous dielectric coating layer 254.

Thus, diffractive pigment flake 250 may be embodied either as a multilayer thin film stack flake or a multilayer thin film encapsulated particle with one or more encapsulating layers therearound.

In some instances, there are advantages to adding optional outer dielectric layers 260*a* and 260*b* as shown in FIG. 13, which can be formed to overlie the outer absorber layers 258*a*, 258*b*. When absorbing coating layer 258 is formed in an encapsulation process, dielectric layers 260*a* and 260*b* can be formed as part of a contiguous outer dielectric coating layer 260 substantially surrounding the underlying layers. These outer dielectric layers can be used to protect the underlying flake or foil structure from exposure to the environment.

In an alternative embodiment, asymmetrical diffractive flakes can be provided which include a thin film stack structure with the same layers as on one side of reflector layer 252 of flake 250 as shown in FIG. 13. Accordingly, the asymmetrical flakes include, for example, a reflector layer, a first dielectric layer overlying the reflector layer, a first absorber layer overlying the first dielectric layer, a second dielectric layer overlying the first absorber layer, a second absorber layer overlying the second dielectric layer, and an optional outer dielectric layer overlying the second absorber layer.

Figure 14:
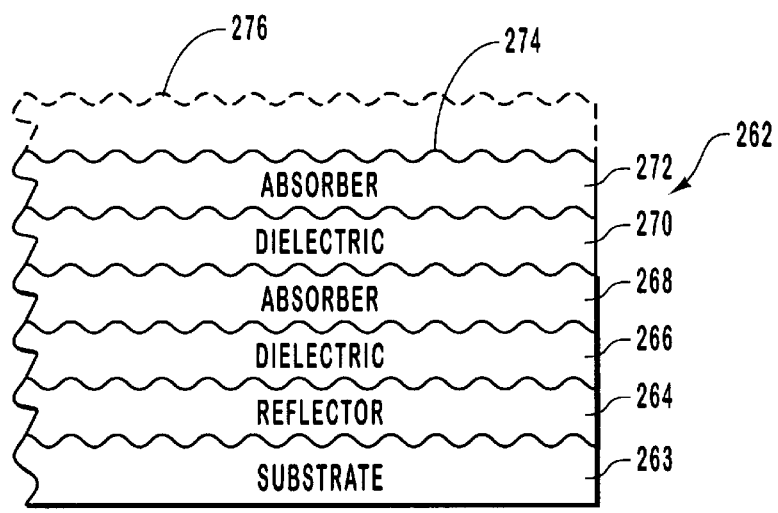
FIG. 14 is a schematic representation of the coating structure of a diffractive foil according to another embodiment of the invention.

The asymmetrical interference structure described in the alternative embodiment of flake 250 can also be used to form a diffractive foil 262 such as shown in FIG. 14. Thus, diffractive foil 262 includes a reflector layer 264 formed on an optionally removable substrate 263, a first dielectric layer 266 overlying reflector layer 264, a first absorber layer 268 overlying first dielectric layer 266, a second dielectric layer 270 overlying first absorber layer 268, and a second absorber layer 272 overlying second dielectric layer 270. A diffractive grating structure 274 is replicated in all of the layers of foil 262. An optional outer dielectric layer 276 can be formed to overlie second absorber layer 272 to protect the underlying foil structure.

The various dielectric layers in the embodiments of FIGS. 13 and 14 can be produced using materials having refractive indices from about 1.2 to about 4.5. In order for the flake or foil device to produce a diffractive yet dark visible appearance, the dielectric layers typically have an optical thickness of about 2 QWOT or less at a selected design wavelength such as about 500 nm or less. Depending on the index of refraction, the dielectric layers have a physical thickness of from about 15 nm to about 200 nm, and preferably from about 20 nm to about 150 nm. The dielectric layers can each be composed of the same material or a different material, and can have the same or different optical or physical thickness for each layer.

The absorber layers in the embodiments of FIGS. 13 and 14 are made up of materials that absorb over most of the visible light spectrum. Examples of suitable materials include metals, metal oxides, and other absorbing materials discussed hereinabove. Depending on the absorption coefficient of the materials, the absorber layers can be formed to have a physical thickness of from about 2 nm to about 50 nm, and preferably from about 4 nm to about 15 nm. The absorber layers can each be composed of the same material or a different material, and can have the same or different physical thickness for each layer.

The reflector, dielectric, and absorber layers in the embodiments of FIGS. 13 and 14 can be composed of the same or similar materials as described above for the corresponding layers in flakes 30 and 50.

Figure 15:
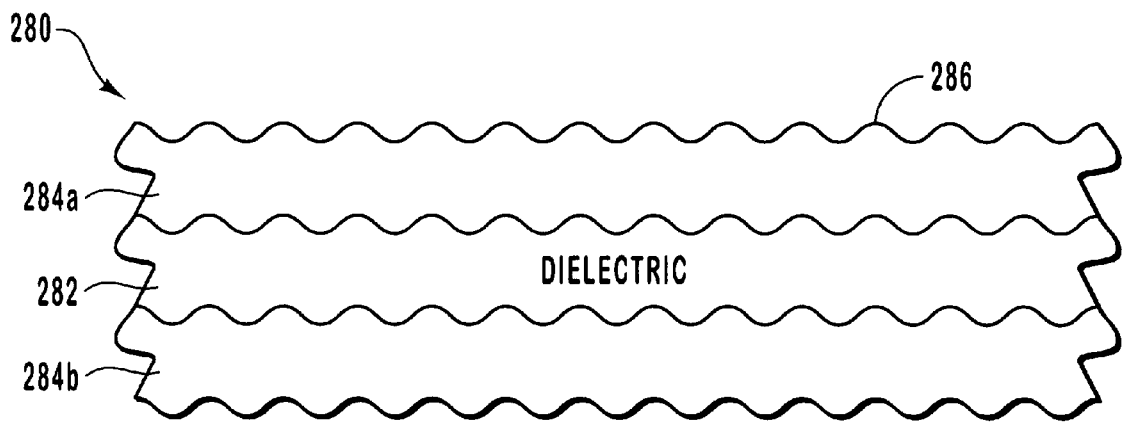
FIG. 15 is a schematic representation of the coating structure of a diffractive interference structure according to one embodiment of the invention.

In a further embodiment of the present invention, a visibly dark yet diffractive appearance is created using a three-layer interference structure in conjunction with a diffractive surface structure. As shown in FIG. 15, such a three-layer diffractive interference structure in the form of a device 280 has a symmetrical coating structure with a central dielectric layer 282 having first and second opposing surfaces. Overlaying the first surface of dielectric layer 282 is a layer 284*a* which is both semi-transparent and semi-reflective. Overlaying the second surface of dielectric layer 282 is another layer 284*b* of both semi-transparent and semi-reflective material. A diffractive grating structure 286 is replicated in all of the layers of device 280. The grating frequency and depth of diffractive grating structure 286 can be determined and formed as described hereinabove.

The three layers of device 280 work together as an interference filter. When light enters the device through layer 284*a*, then layer 284*b* acts as the reflector while layer 284*a* serves as the absorber. Conversely, when light enters the device through layer 284*b*, then layer 284*a* acts as the reflector while layer 284*b* serves as the absorber. Through destructive interference of visible wavelengths, device 280 appears dark when viewed from either side.

The dielectric layer 282 in device 280 can be composed of various dielectric materials, such as those discussed previously with respect to the dielectric layers of flake 250. One preferred dielectric material is magnesium fluoride. The dielectric layer 282 in device 280 is formed to be thin enough to avoid imparting interference color and color shifting properties to the flake. Accordingly, the optical thickness of dielectric layer 282 is from about 1 QWOT at about 200 nm to about 2 QWOT at about 500 nm, and preferably from about 1 QWOT at about 300 nm to about 1 QWOT at about 700 nm.

The semi-transparent, semi-reflective layers 284*a* and 284*b* of device 280 can be composed of any absorber material having the desired reflective, absorptive, and transmissive properties, including materials that are uniformly absorbing or non-uniformly absorbing in the visible part of the electromagnetic spectrum. Thus, selective absorbing materials or nonselective absorbing materials can be used. For example, the absorbing materials can be a nonselective absorbing metallic material, such as chromium, deposited to a thickness at which the layer is at least partially absorbing, or semi-opaque.

The device 280 can be applied to a carrier web and used as a foil. Alternatively, a plurality of diffractive flakes corresponding to device 280 can be formed by a web coating process in which the various layers are sequentially deposited on a web material to form a thin film structure. This thin film structure is subsequently fractured and removed from the web to form a plurality of flakes.

In a further alternative coating structure, device 280 may be formed in an encapsulation process to produce encapsulated flake particles. For example, an encapsulation process can be used such that semi-transparent, semi-reflective layers 284a and 284b are formed as part of a contiguous semi-transparent, semi-reflective layer substantially surrounding the dielectric layer.

Figure 16:
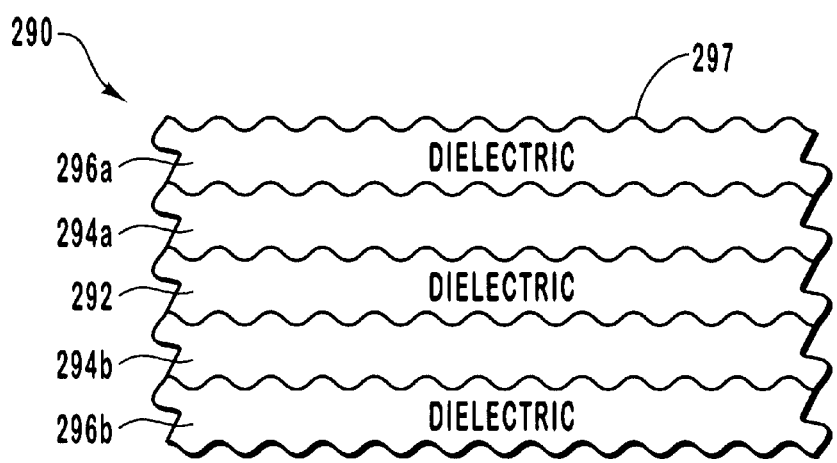
FIG. 16 is a schematic representation of the coating structure of a diffractive interference structure according to another embodiment of the invention.

In another embodiment of the present invention, a dark visible appearance is created using a five-layer interference structure in conjunction with a diffractive surface structure. As shown in FIG. 16, such a five-layer interference structure in the form of a device 290 has a symmetrical coating structure with a central dielectric layer 292 having first and second opposing surfaces. Overlaying the first surface of dielectric layer 292 is a first semi-transparent/semi-reflective layer 294a. Overlaying the second surface of dielectric layer 292 is a second semi-transparent/semi-reflective layer 294b. A first outer dielectric layer 296a overlies first layer 294a, and a second outer dielectric layer 296b overlies second layer 294b. A diffractive grating structure 297 is replicated in all of the layers of device 290. The grating frequency and depth of diffractive grating structure 279 can be determined and formed as described hereinabove.

The dielectric layers of device 290 can be composed of various dielectric materials such as those discussed previously with respect to the dielectric layers of flake 250. The dielectric layer 292 in device 290 is formed to be thin enough to avoid imparting interference color and color shifting properties. Accordingly, the optical thickness of dielectric layer 292 is about 1 QWOT at 200 nm to about 2 QWOT at 500 nm, and preferably about 1 QWOT at 300 nm to about 1 QWOT at 700 nm.

The outer dielectric layers 296a and 296b can have a wide range of physical thickness, such as from about 10 nm to about 500 nm, and preferably from about 50 nm to about 250 nm. The outer dielectric layers 296a and 296b can be used to protect the underlying structure from exposure to the environment. When the optical thickness of outer dielectric layers 296a and 296b is approximately the same as that of dielectric layer 292, the outer dielectric layers enhance the interference effect within the structure.

The semi-transparent/semi-reflective layers 294a and 294b of device 290 can be composed of any absorber material having the desired reflective, absorptive, and transmissive properties, including materials that are uniformly absorbing or non-uniformly absorbing in the visible part of the electromagnetic spectrum. Thus, selective absorbing materials or nonselective absorbing materials can be used as described above for device 280.

The device 290 can be applied to a carrier web and used as a foil. Alternatively, a plurality of diffractive flakes corresponding to device 290 can be formed by a web coating process in which the various layers are sequentially deposited on a web material to form a thin film structure. This thin film structure is subsequently fractured and removed from the web to form a plurality of flakes.

In a further alternative coating structure, device 290 may be formed in an encapsulation process to produce encapsulated flake particles. For example, outer dielectric layers 296a and 296b can be formed as part of a contiguous outer dielectric coating layer substantially surrounding the underlying layers. In addition, an encapsulation process can be used such that semi-transparent/semi-reflective layers 294a and 294b are formed as part of a contiguous semi-transparent/semi-reflective layer substantially surrounding dielectric layer 292.

The following examples are given to illustrate the present invention, and are not intended to limit the scope of the invention.

EXAMPLES

In order to quantify the color characteristics of a particular object, it is useful to invoke the L*a*b* color coordinate system developed by the Commission Internationale de l'Eclairage (CIE 1976), which is now used as a standard in the industry in order to precisely describe color values. In this system, L* indicates lightness and a* and b* are the chromaticity coordinates. The L*a*b* color system was used to generate various a*b* diagrams described in some of the following examples which plot the color trajectory and chromaticity of a selected diffractive pigment. In some of the examples which follow, the color characteristics also include chroma (C*) which corresponds to color purity, and hue (h) which corresponds to color variation with changing angle.

The L*a*b* color system allows for a comparison of the color differences between two measurements through the parameter $\Delta E_{ab}$, which indicates the change in color as measured in the L*a*b* color space, such as the color difference of two different pigment designs. The numerical value for $\Delta E_{ab}$ is calculated through the following equation using the measured L*a*b* values:

$$\Delta E_{ab} = [(\Delta L^*)^2 + (\Delta a^*)^2 + (\Delta b^*)^2]^{1/2}$$

where the symbol $\Delta$ denotes the difference in measurements being compared.

The Laneta drawdowns described in some of the following examples were analyzed using a Murakami goniospectrophotometer. A "drawdown" is a paint or ink sample spread on paper to evaluate the color. Typically, a drawdown is formed with the edge of a putty knife or spatula by "drawing down" a small glob of paint or ink to get a thin film of the paint or ink. Alternatively, the drawdown is made using a Mayer rod pulled across a Laneta card and through a small glob of paint. The Murakami device, in the selected configuration, provides information for a fixed illumination position (45°) and variable viewer angle (−80° to 80°) related to the sample lightness (L*) and the a*,b* chromaticity coordinates in the L*a*b* color space for the measured sample.

Examples 1–7

The amount of energy relative to the incident energy (efficiency) of diffractive gratings varies as a function of the type of grating and its groove depth. As a result gratings can be optimized for specific wavelengths. The light spectrum distribution in the various diffracted orders for any wavelength will be given by equation 1 set forth previously.

Various diffractive gratings (Examples 1–7) having from 500 ln/mm to 3000 ln/mm were modeled using conventional optical software to determine optimal grating configurations. FIGS. 17–22 are graphs of the modeling results, showing diffraction angles as a function of various wavelengths for the various diffractive gratings of Examples 1–7. In particular, FIGS. 17–22 show the diffraction angles for various visible wavelengths (400 nm violet to 700 nm red)

at normal and 45° incidence. Table 1 below sets forth the specific Example number with the corresponding Figure number and grating structure that was modeled.

TABLE 1

| Example | FIG. | Grating Structure |
|---|---|---|
| 1 | 17 | 500 ln/mm grating |
| 2 | 18 | 1000 ln/mm grating |
| 3 | 19 | 1400 ln/mm grating |
| 4 | 20 | 2000 ln/mm grating |
| 5 | 21 | 2400 ln/mm grating |
| 6 | 22 | 2500 ln/mm grating |
| 7 | 22 | 3000 ln/mm grating |

Figure 17:
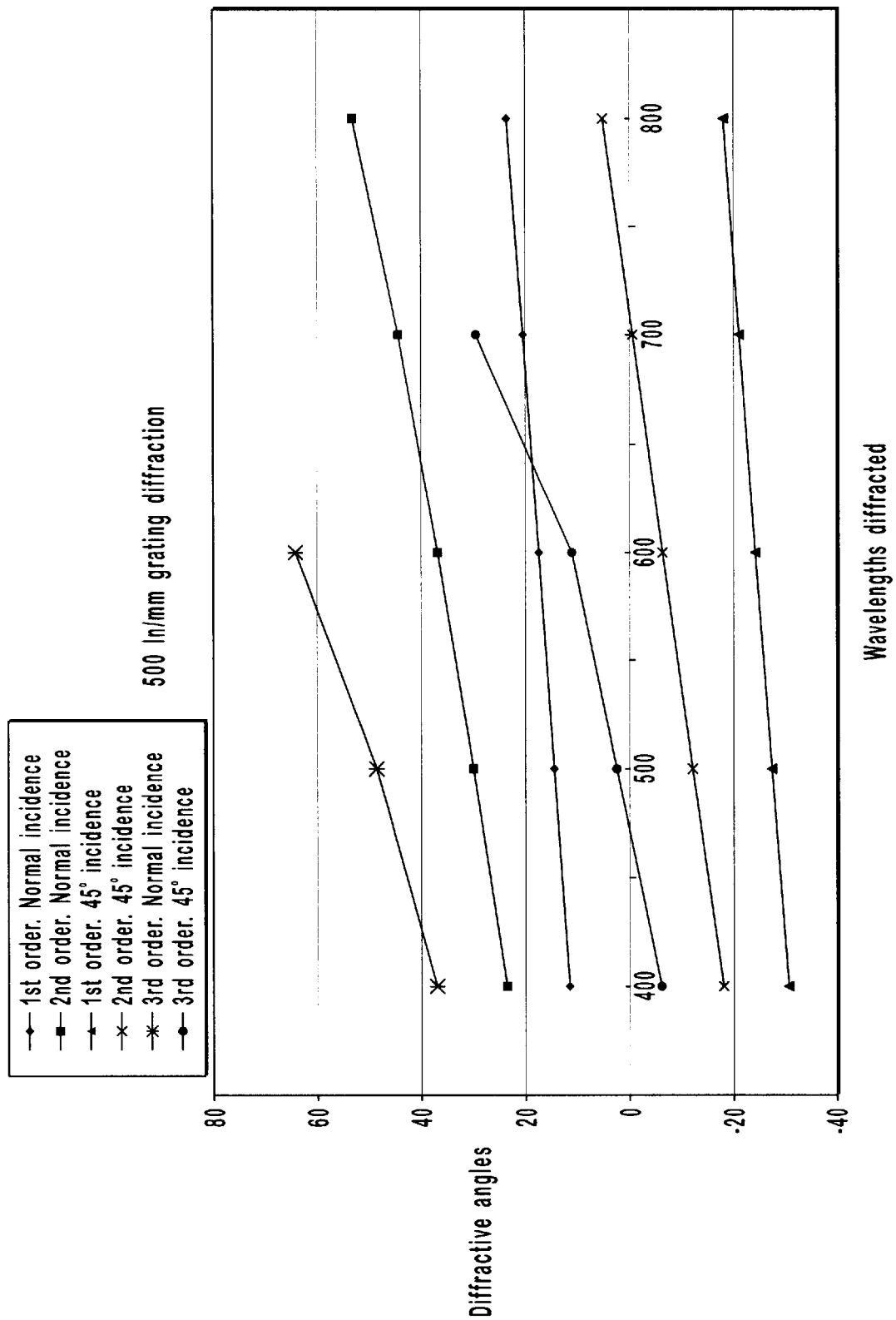
FIG. 17 is a graph illustrating the diffraction angle for various wavelengths at normal and 45° incidence for a diffractive grating having 500 ln/mm.
Figure 18:
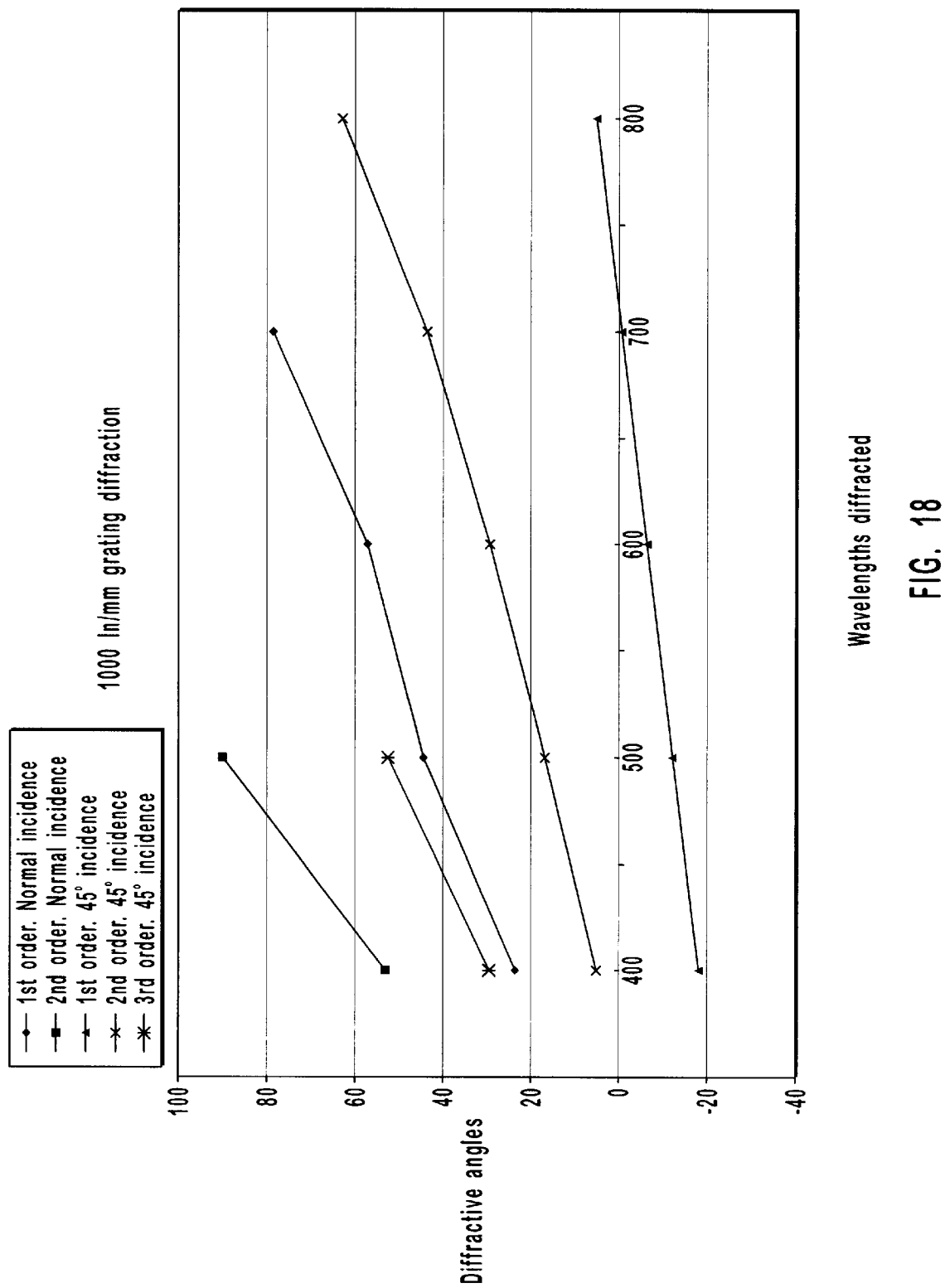
FIG. 18 is a graph illustrating the diffraction angle for various wavelengths at normal and 45° incidence for a diffractive grating having 1000 ln/mm.
Figure 19:
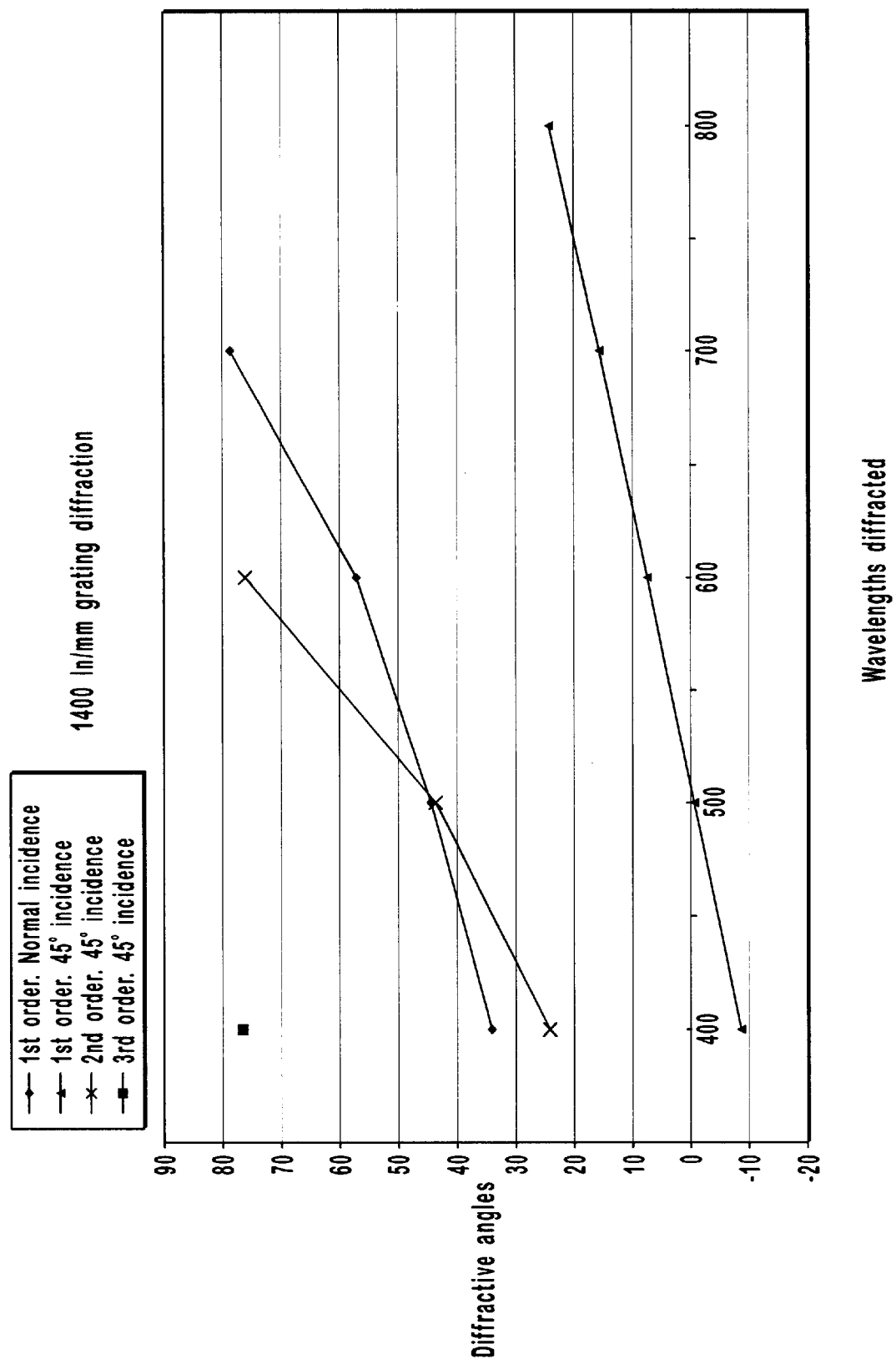
FIG. 19 is a graph illustrating the diffraction angle for various wavelengths at normal and 45° incidence for a diffractive grating having 1400 ln/mm.
Figure 20:
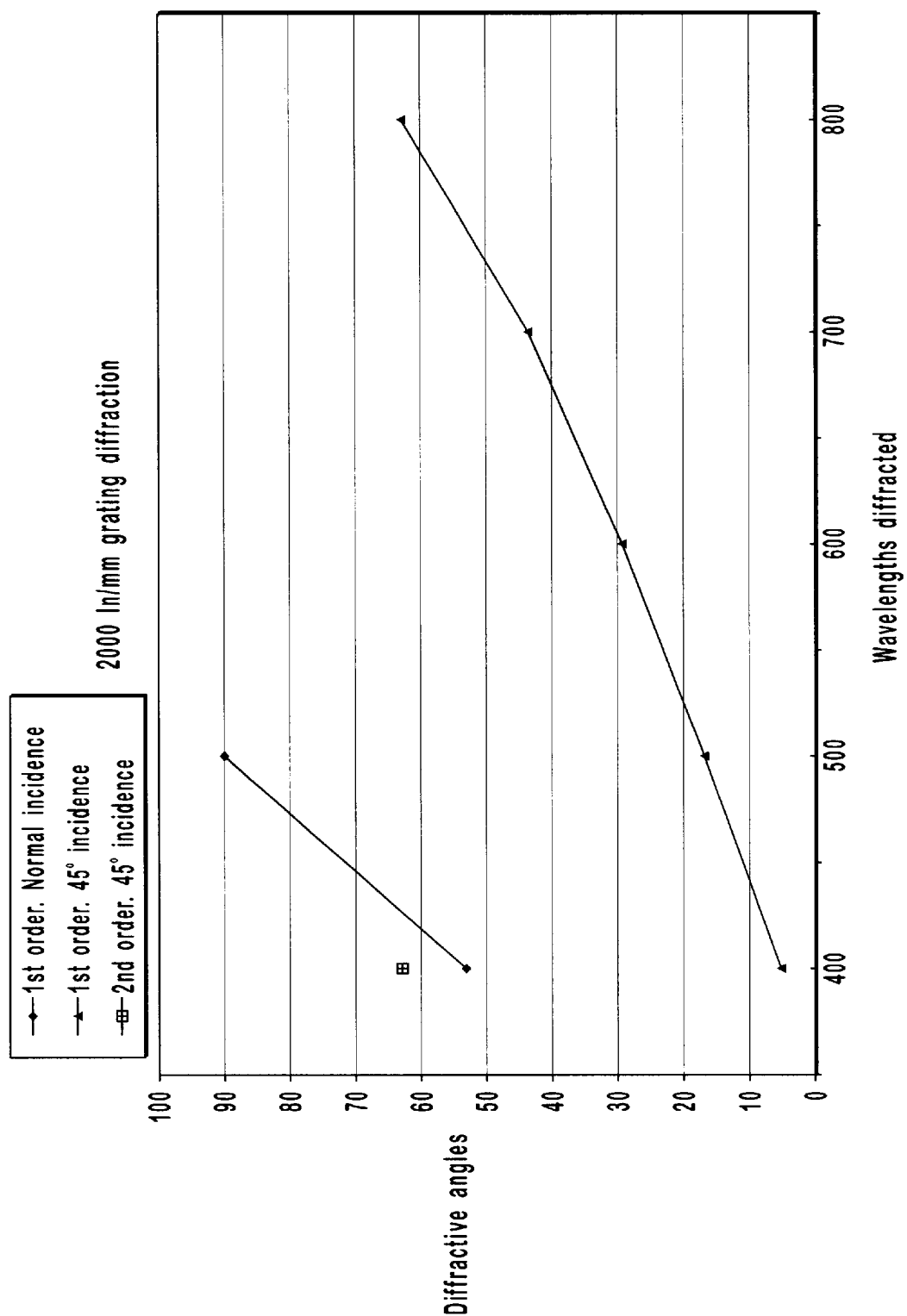
FIG. 20 is a graph illustrating the diffraction angle for various wavelengths at normal and 45° incidence for a diffractive grating having 2000 ln/mm.
Figure 21:
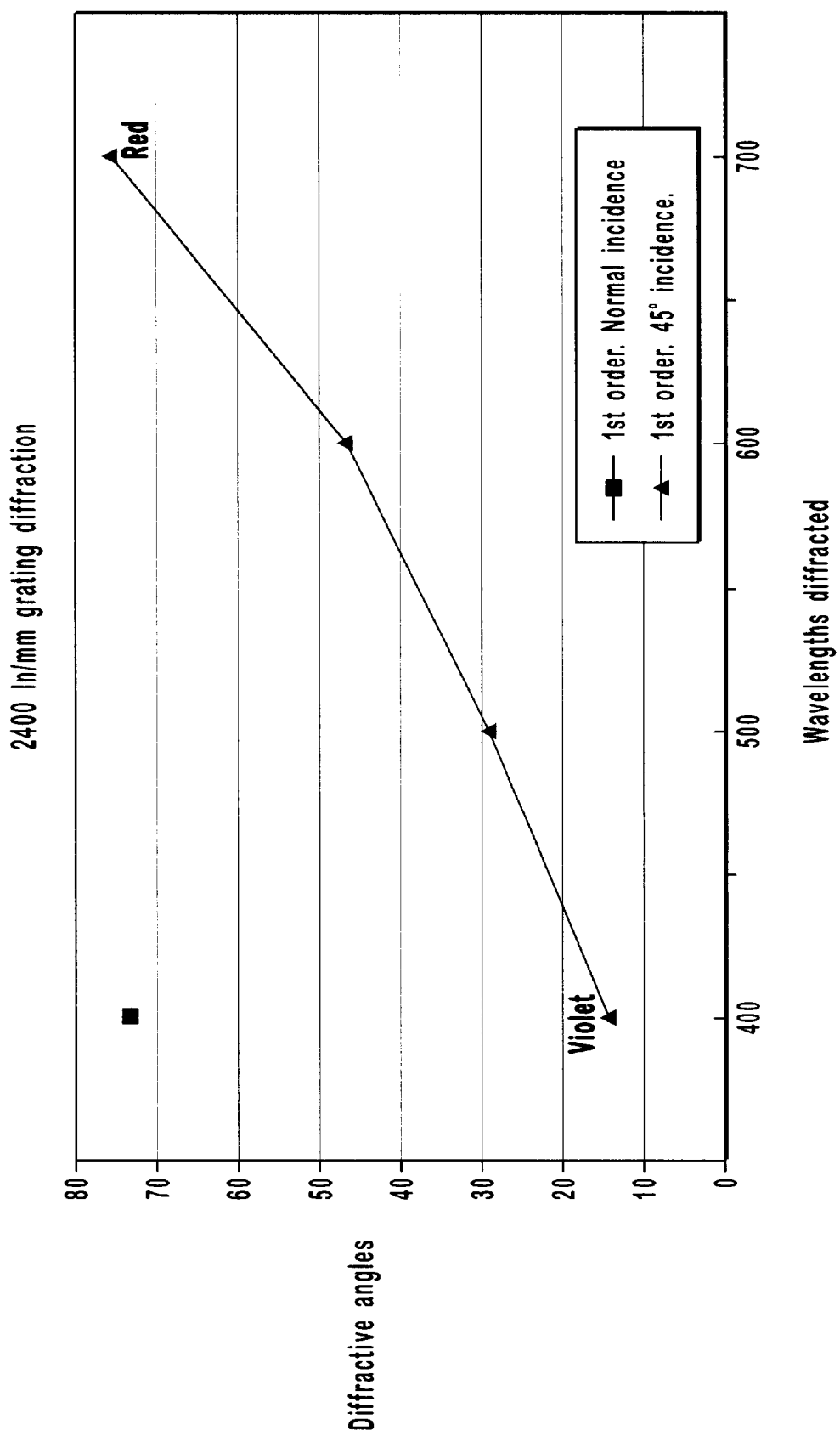
FIG. 21 is a graph illustrating the diffraction angle for various wavelengths at normal and 45° incidence for a diffractive grating having 2400 ln/mm.
Figure 22:
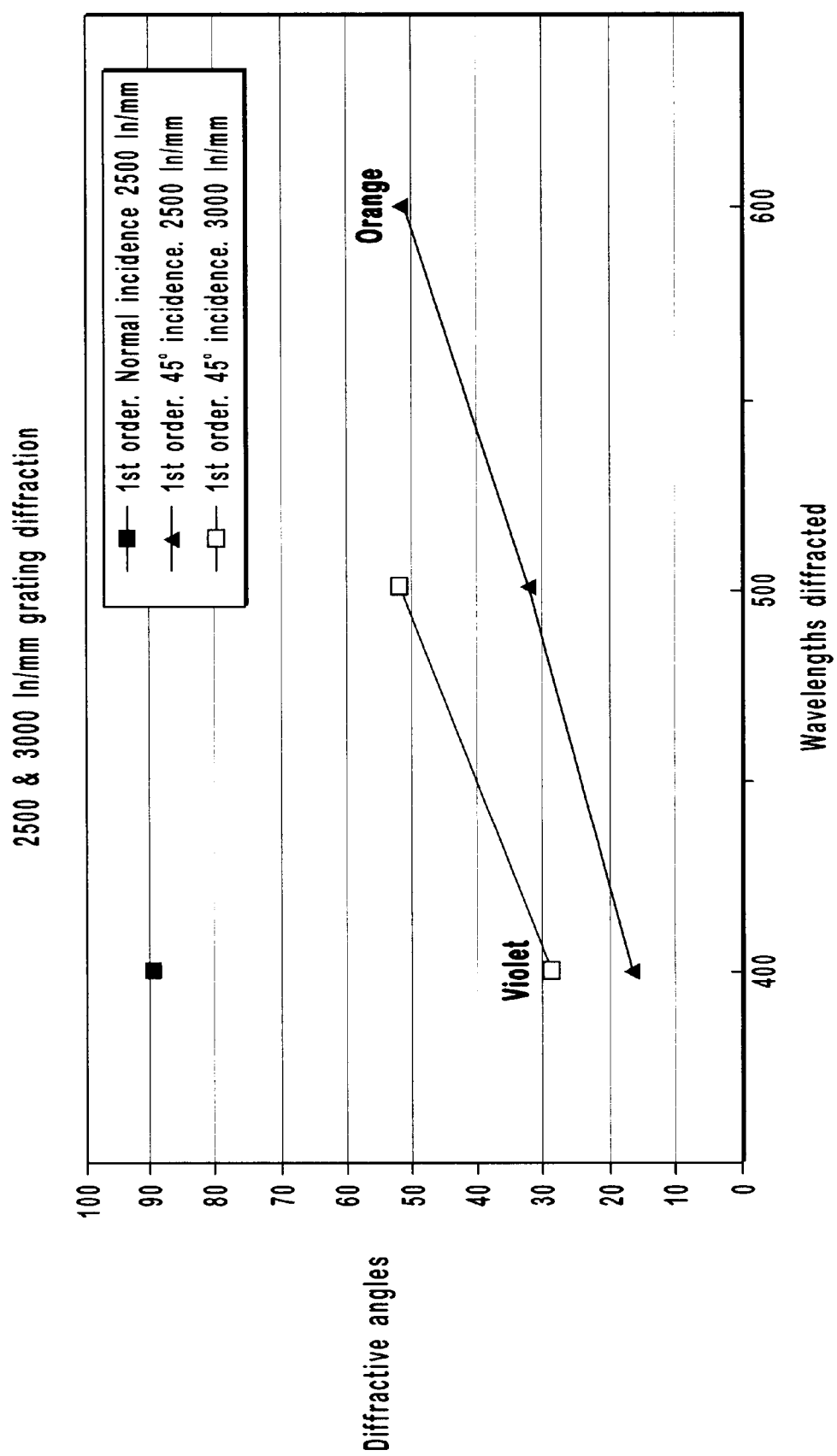
FIG. 22 is a graph illustrating the diffraction angle for various wavelengths at normal and 45° incidence for a diffractive grating having 2500 ln/mm and a diffractive grating having 3000 ln/mm.

For the 500 ln/mm grating (Example 1), the $2^{nd}$ and $3^{rd}$ order spectra overlap for both normal and 45° incidence, as shown in FIG. 17. In the case of the 1000 ln/mm grating (Example 2), overlapping occurs for the $1^{st}$ and $2^{nd}$ order at normal and 45° incidence, as shown in FIG. 18. No overlapping is observed at a frequency equal to or higher than 1400 ln/mm (Examples 3–7), as shown in FIGS. 19–22.

Example 8

Figure 23:
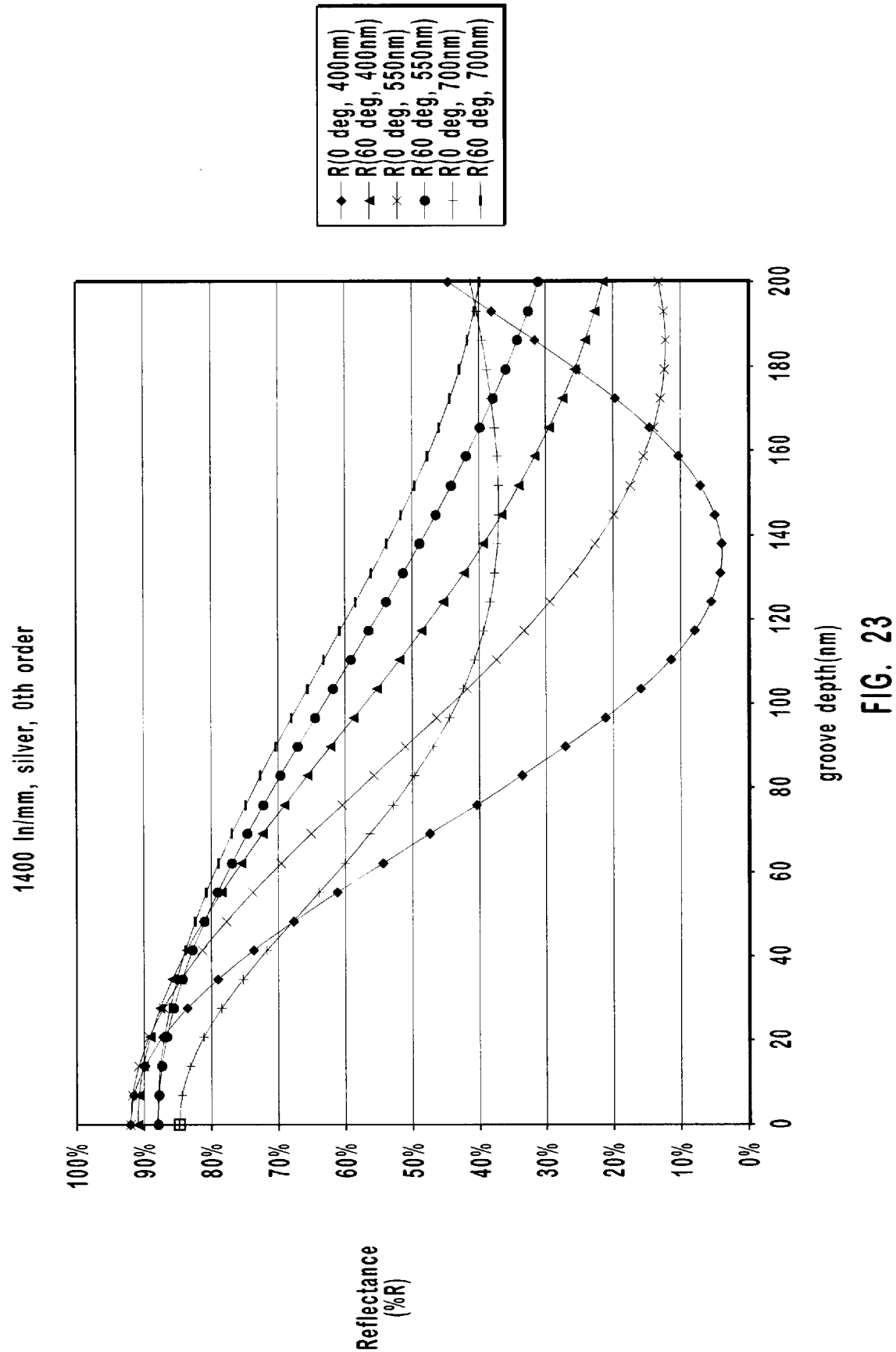
FIGS. 23 and 24 are graphs showing the theoretical efficiency of 1400 ln/mm aluminized sinusoidal gratings at various groove depths at normal and 60° incidence for various wavelengths of light.
Figure 24:
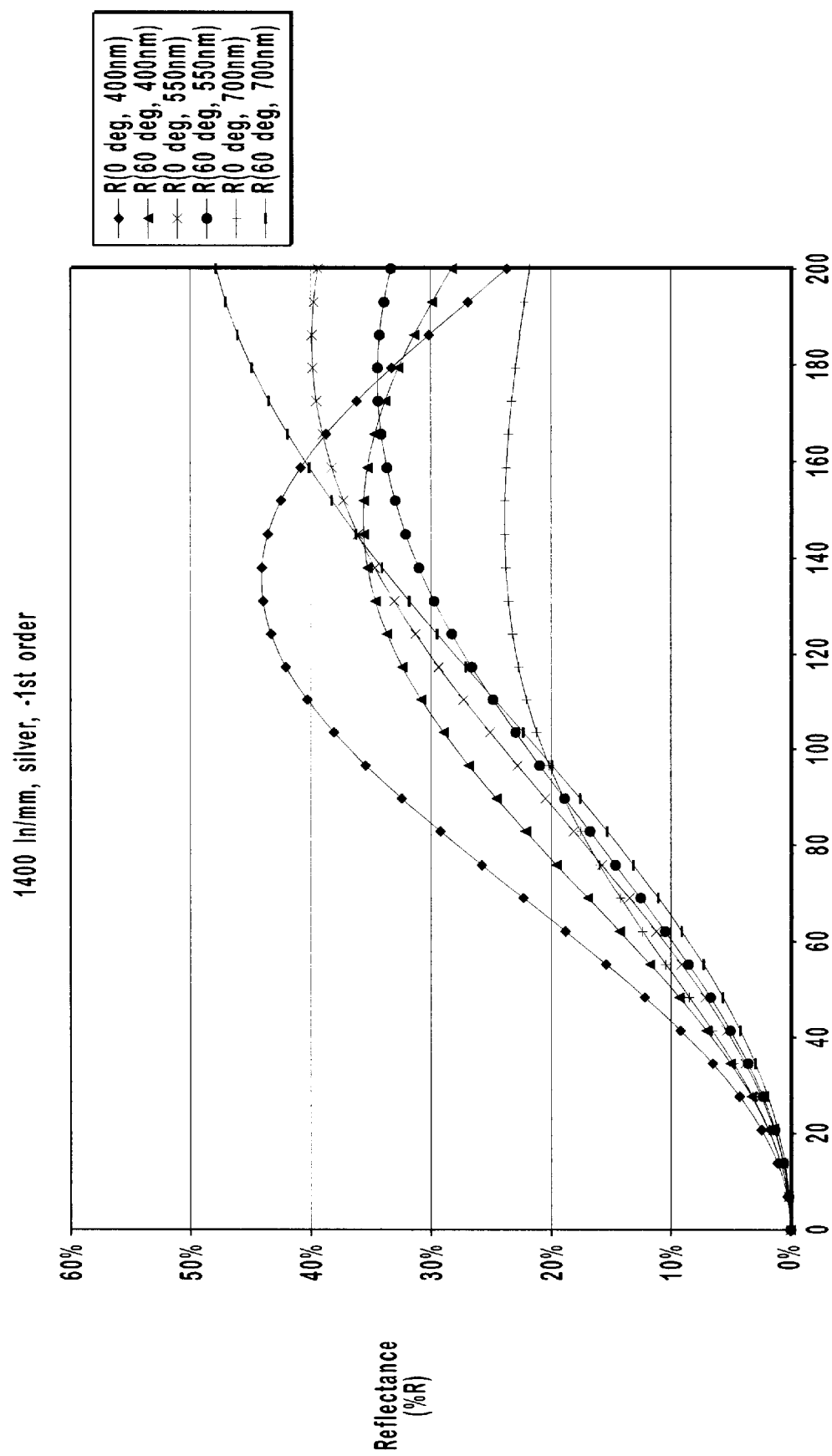

An aluminized sinusoidal diffractive grating having 1400 ln/mm was modeled using conventional optical software. FIGS. 23 and 24 are graphs showing the theoretical efficiency (percent reflectance) of the grating at various groove depths at normal and 60° incidence for 400, 550 and 700 nm wavelength light. The results of the modeling showed that a groove depth close to about 160 nm is a good compromise to get a minimum zero order and a maximum $1^{st}$ order contribution, thereby enhancing the diffractive effects of the grating.

Using the same criteria, the optimum groove depth was determined to be about 220 nm for a 2000 ln/mm grating, and about 116 nm for a 3000 ln/mm grating.

Examples 9–10

Figure 25:
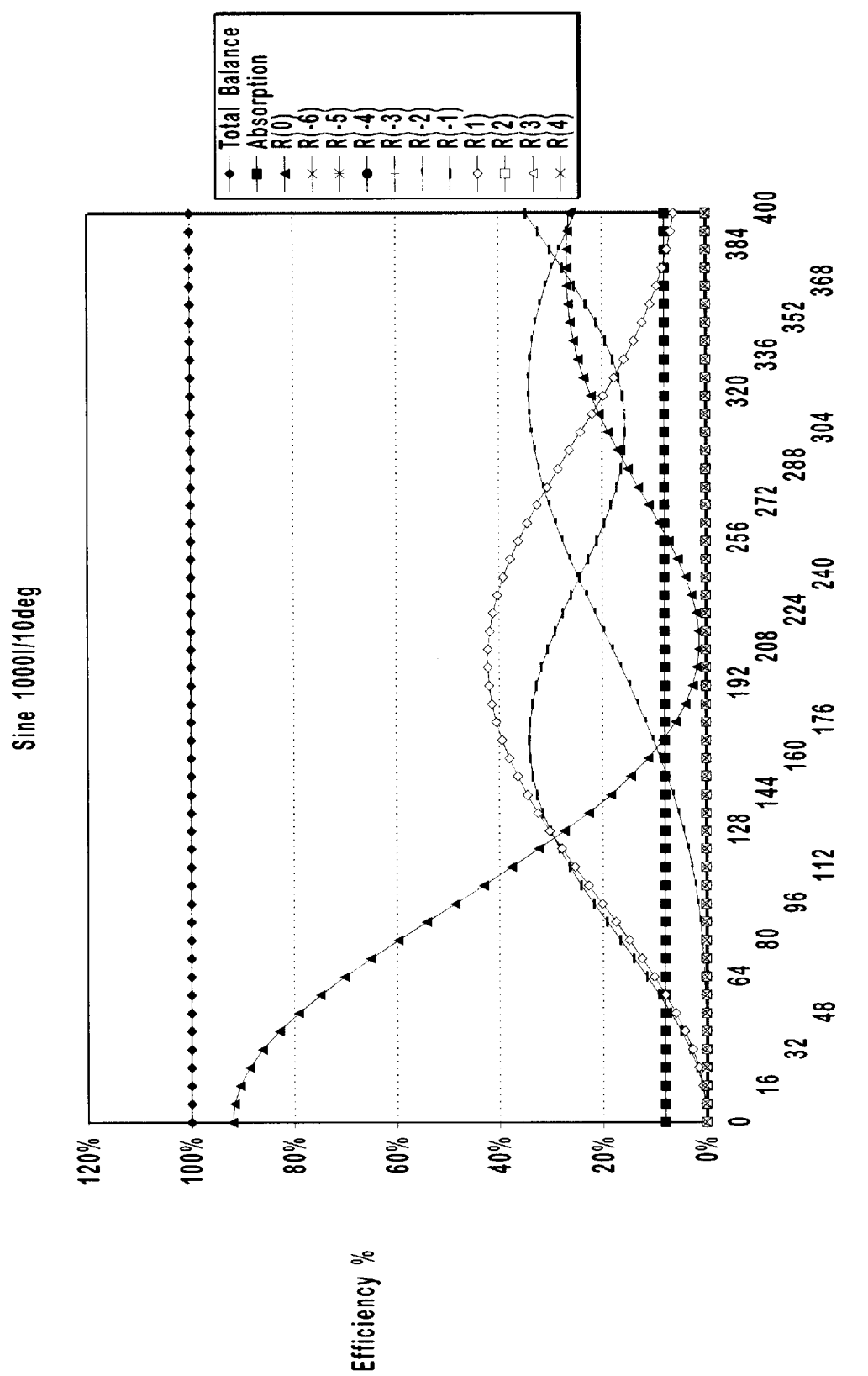
FIGS. 25 and 26 are graphs showing the theoretical efficiency of 1000 ln/mm aluminized sinusoidal and square-wave gratings at various grating depths.
Figure 26:
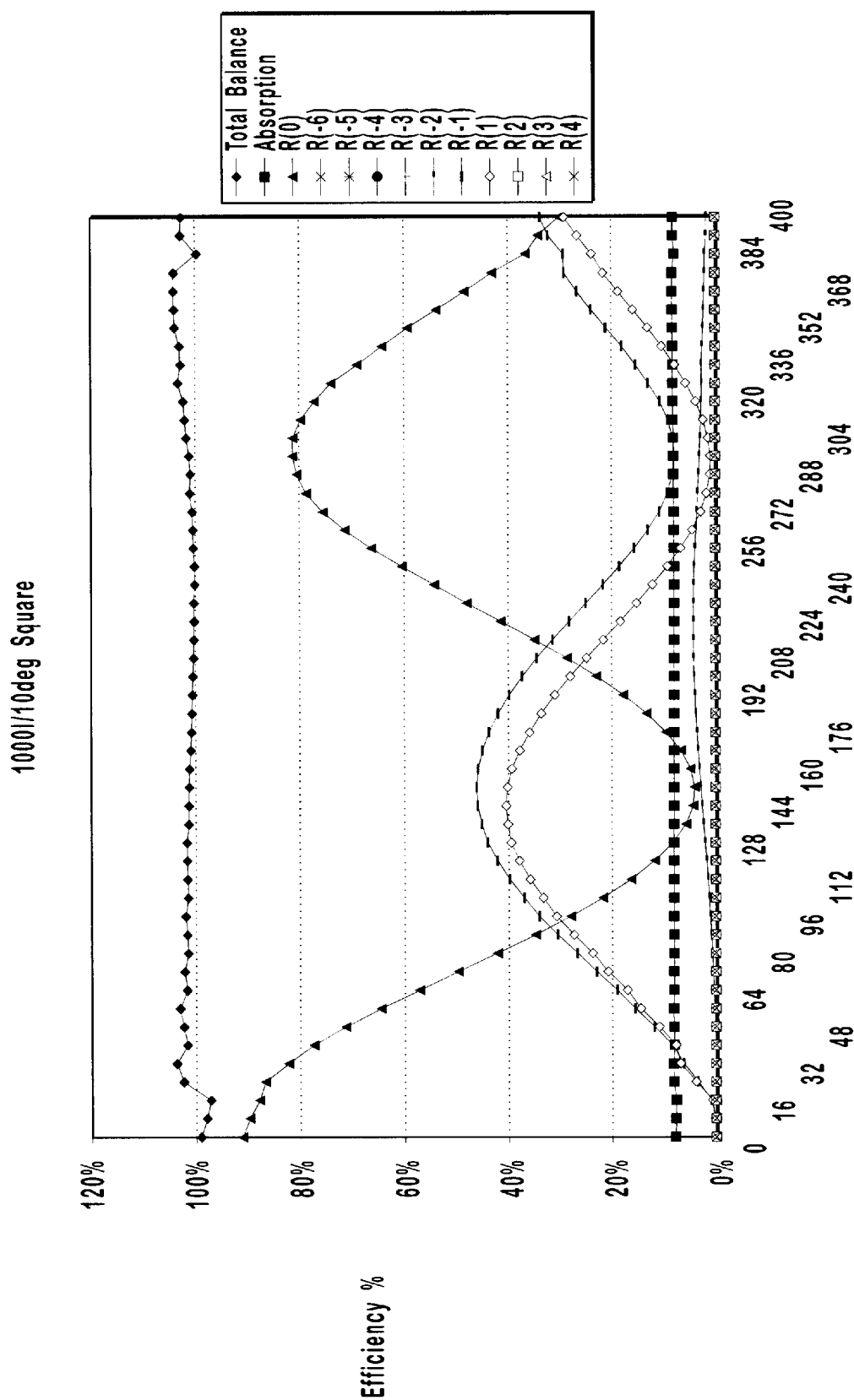

An aluminized sinusoidal diffractive grating having 1000 ln/mm (Example 9), and an aluminized square-wave diffractive grating having 1000 ln/mm (Example 10) were modeled using conventional optical software. The grating of Example 10 was symmetrical, with a ratio between the length of the top of the line and the grating period equal to 0.5. FIGS. 25 and 26 are graphs showing the theoretical efficiency of the gratings of Examples 9 and 10 at various groove depths and at quasi normal incidence for 550 nm.

The modeling showed that for square-wave gratings having 1000 ln/mm, the maximum of the orders is obtained at a groove depth of about 150 nm that corresponds with the minimum of the zero order. At the same frequency, sinusoidal gratings present a maximum of the $1^{st}$ order and a minimum of the zero order for a groove depth of about 200 nm. However, in contrast with the square-wave configuration, the successive orders in the sinusoidal gratings do not follow the same pattern. Nevertheless, the square-wave configuration does not appear to have a strong benefit in comparison to the sinusoidal grating. Any such benefit becomes even less important considering that for practical purposes, it will be more difficult to strip a square-wave stacked foil than a sinusoidal stacked foil and that for higher grating frequencies the $2^{nd}$ order will no longer exist.

Example 11

Figure 27:
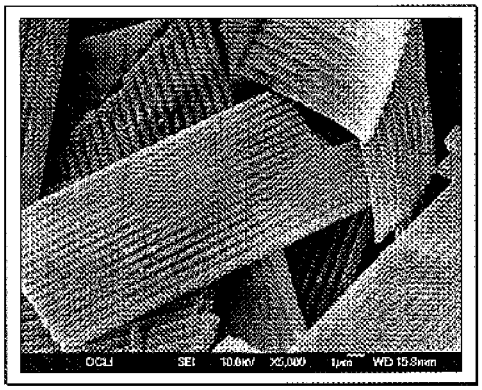
FIGS. 27–31 are photographs taken with a Scanning Electron Microscope of various diffractive pigment flakes made according to the invention.
Figure 28:
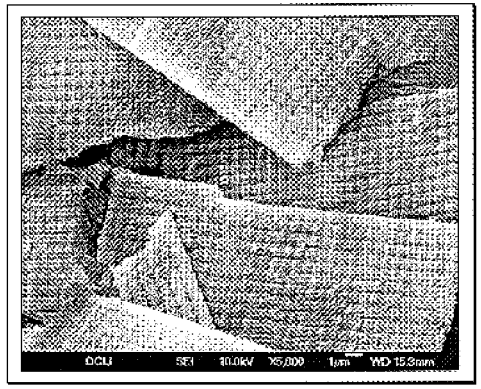
Figure 29:
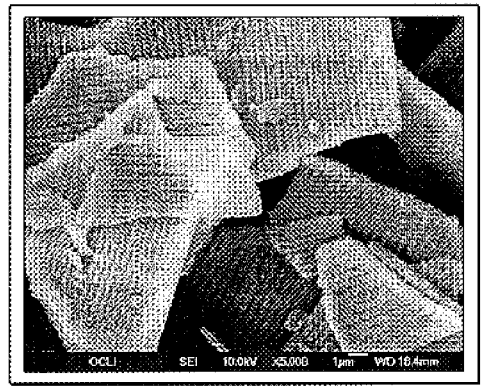
Figure 30:
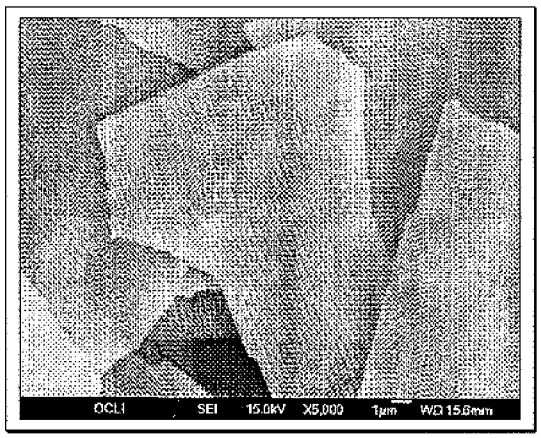
Figure 31:
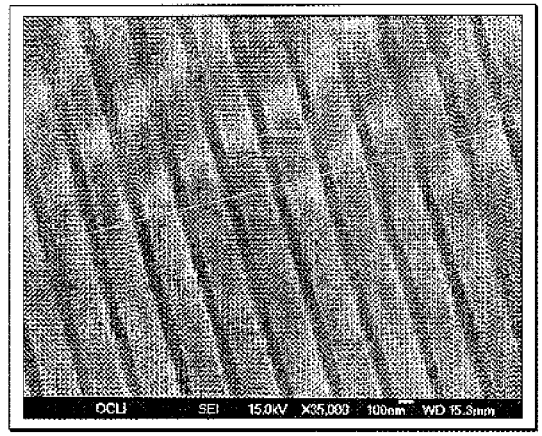

FIGS. 27–31 are photographs taken with a Scanning Electron Microscope of various ground diffractive flakes produced according to the present invention. Specifically, FIG. 27 shows flakes with a 1400 ln/mm linear grating, FIG. 28 shows flakes with a 1400 ln/mm cross grating, and FIG. 29 shows flakes with a 2000 ln/mm linear grating. FIGS. 30 and 31 are photographs of flakes with a 3000 ln/mm linear grating. FIGS. 30 and 31 verify that even for high grating frequencies, the grating pattern is transferable to a thin film stack used to make grated flakes. The microstructure obtained in all cases was very homogeneous, indicating a good replication of the grating substrates.

Example 12

Figure 32:
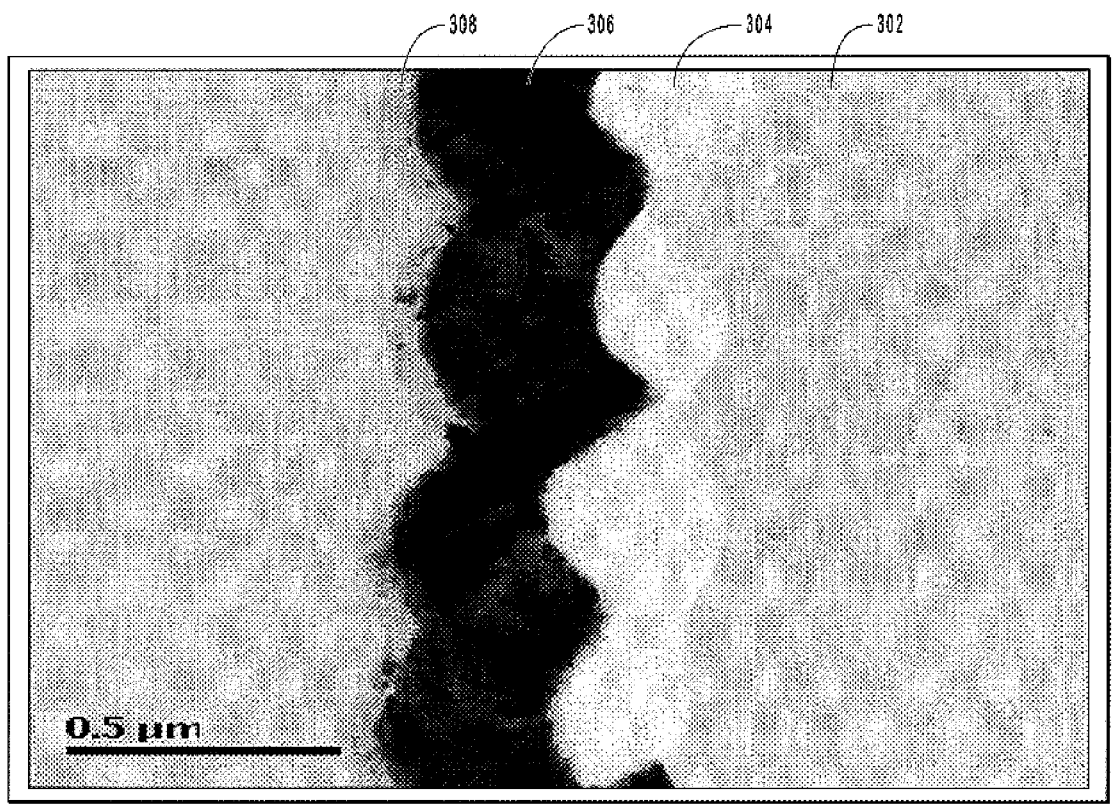
FIG. 32 is a cross-section transmission electron micrograph showing the coating microstructure of a diffractive pigment flake made according to the invention.

FIG. 32 is a cross-section transmission electron micrograph showing the coating microstructure of a diffractive pigment particle which has been delaminated from a grating substrate. In particular, the micrograph shows a 2000 ln/mm grating 302 used to form a multilayer coating structure including a dielectric layer 306 and a reflective layer 308. A delamination zone 304 is shown between grating 302 and dielectric layer 306. The dielectric layer 306 is a 7 QWOT layer of ZnS at 550 nm, and the reflective layer 308 is an 80 nm layer of Al. The physical thickness of the ZnS layer is about 410 nm, thus providing a thin film stack with a physical coating thickness of about 490 nm. The micrograph shows that the coating layers follow the profile of grating 302 and thus should maintain the diffractive optical effects of the uncoated grating.

Example 13

A diffractive foil product was formed by depositing the following thin film layers onto a lined diffractive grating polymer web substrate:

Cr/1$QWOT$ MgF$_2$@330 nm/Al/substrate

The Cr layer had a thickness of 8 nm, and the Al layer had a thickness of 80 nm. The diffractive foil product had a black background at all angles with a rainbow-like diffractive effect when the foil was bent or reoriented.

Example 14

An achromatic, dark diffractive pigment was formed by depositing the following thin film layers onto a 50 nm release layer of cryolite (Na$_3$AlF$_6$) overlying a lined diffractive grating polymer web substrate:

Cr/1$QWOT$ MgF$_2$@330 nm/Al/1$QWOT$ MgF$_2$@330 nm/Cr

Example 15

An achromatic, dark diffractive pigment was formed by depositing the following thin film layers onto a 60 nm NaCl release layer overlying a 2000 lines per mm grating foil:

Cr/1$QWOT$ MgF$_2$@330 nm/Al/2$QWOT$ MgF$_2$@550 nm/Al/
1$QWOT$ MgF$_2$@330 nm/Cr

The Cr layers had a thickness of 8 nm, and the Al layers had a thickness of 80 nm.

The grating foil and deposited layers were exposed to water, dissolving the NaCl layer, thereby converting the thin film stack into flakes. Thereafter, the flakes were added to a paint vehicle and: 1) applied to a Laneta card as a drawdown; 2) sprayed onto a paint panel both with and without a gloss overcoat; and 3) sonic-ground before being sprayed onto a second paint panel both with and without a gloss overcoat. All three samples showed the rainbow-like effect of the diffraction grating substrate despite the fact that the flakes' rotational orientation within the plane of the paper was totally random. The paint panel made from unground flake gave a more apparent diffractive effect than the sonic-ground pigment coated panel. The low lightness (L*) of the pigment background enhanced the visibility of the diffractive effect. Some of the diffractive pigment flakes in the paint vehicle were also sprayed onto objects with different shapes to show their decorative appearance.

The coating design of the pigment of Example 15 produced a background of the pigment that was a dark gray, without considering the colors produced by diffraction or when viewed with strict diffuse light.

Examples 16–19

Various achromatic, dark diffractive pigments were formed by depositing the following thin film layer designs onto a release layer overlying a lined grating foil:

1$QWOT$ MgF$_2$@550 nm/8 nm Cr/1$QWOT$ MgF$_2$@330 nm/160 nm Al/1$QWOT$ MgF$_2$@330 nm/8 nm Cr/1$QWOT$ MgF$_2$@550 nm (Ex. 16)

1$QWOT$ MgF$_2$@480 nm/5 nm Cr/1$QWOT$ MgF$_2$@360 nm/80 nm Cr/1$QWOT$ MgF$_2$@360 nm/5 nm Cr/1$QWOT$ MgF$_2$@480 nm (Ex. 17)

3$QWOT$ MgF$_2$@500 nm/13 nm Cr/3$QWOT$ MgF$_2$@500 nm (Ex. 18)

4$QWOT$ MgF$_2$@500 nm/100 nm Cr/4$QWOT$ MgF$_2$@500 nm (Ex. 19)

The grating foil and deposited layers in each of Examples 16–19 were exposed to water, dissolving the release layer, thereby converting the thin film stacks into flakes. Thereafter, the flakes were added to a paint vehicle and applied to Laneta cards as drawdowns.

Table 2 below sets forth the color data generated for the pigment drawdowns of Examples 16–19, as well as for the pigment drawdown of Example 15 for comparison, including the values measured for L*, a*, b*, C* and h.

TABLE 2

| Example | L* | a* | b* | C* | H |
|---|---|---|---|---|---|
| 16 | 29.02 | 2.79 | −3.58 | 4.54 | 307.98 |
| 19 | 44.39 | 0.93 | −3.58 | 3.7 | 284.54 |
| 18 | 36.49 | 0.07 | −5.77 | 5.77 | 270.73 |
| 17 | 27.26 | 2.45 | 1.32 | 2.78 | 28.3 |
| 15 | 43.64 | −1.29 | −4.16 | 4.35 | 252.76 |

Figure 33:
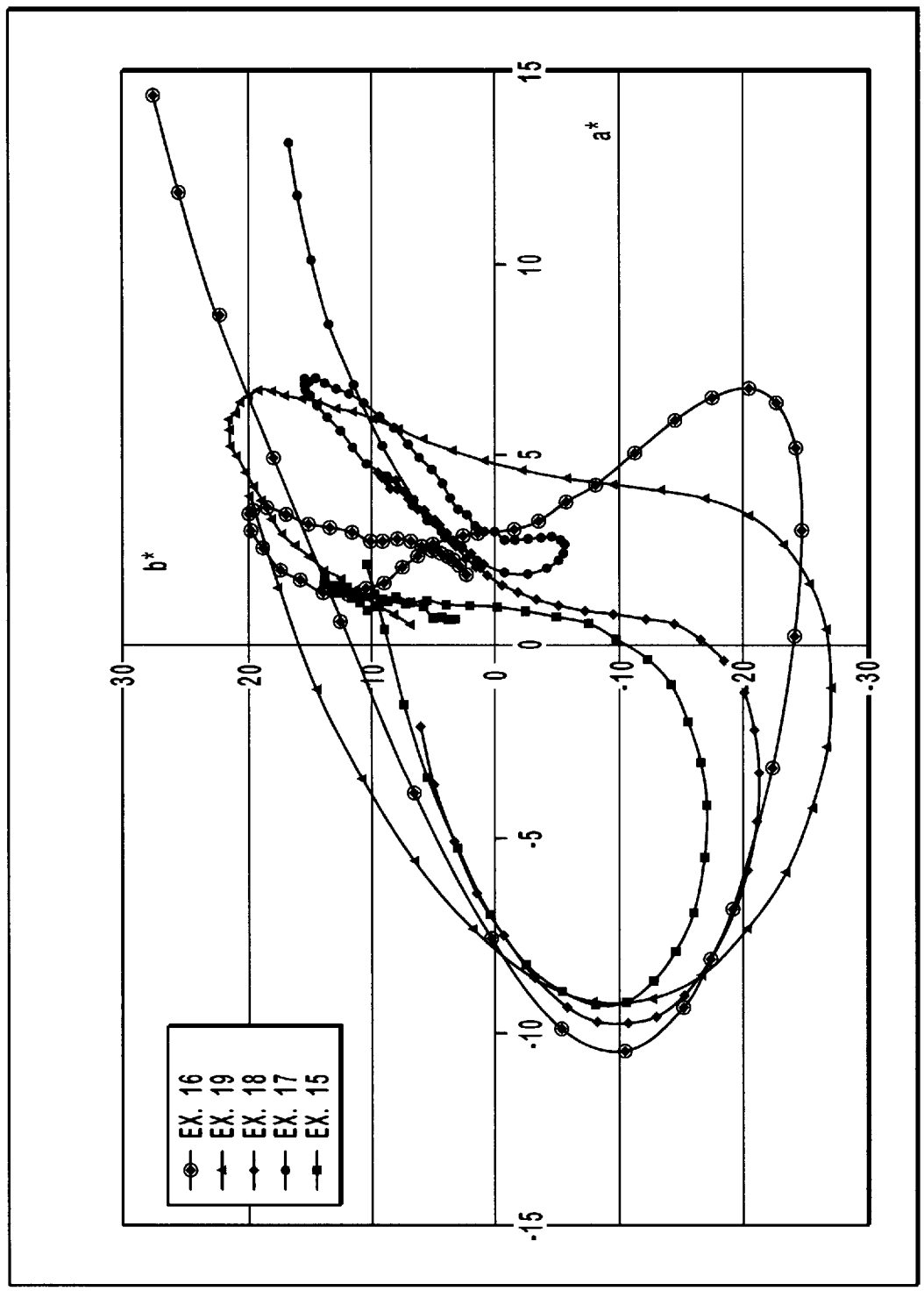
FIG. 33 is an a*b* diagram which plots the color trajectory and chromaticity of various diffractive pigments of the invention.
Figure 34:
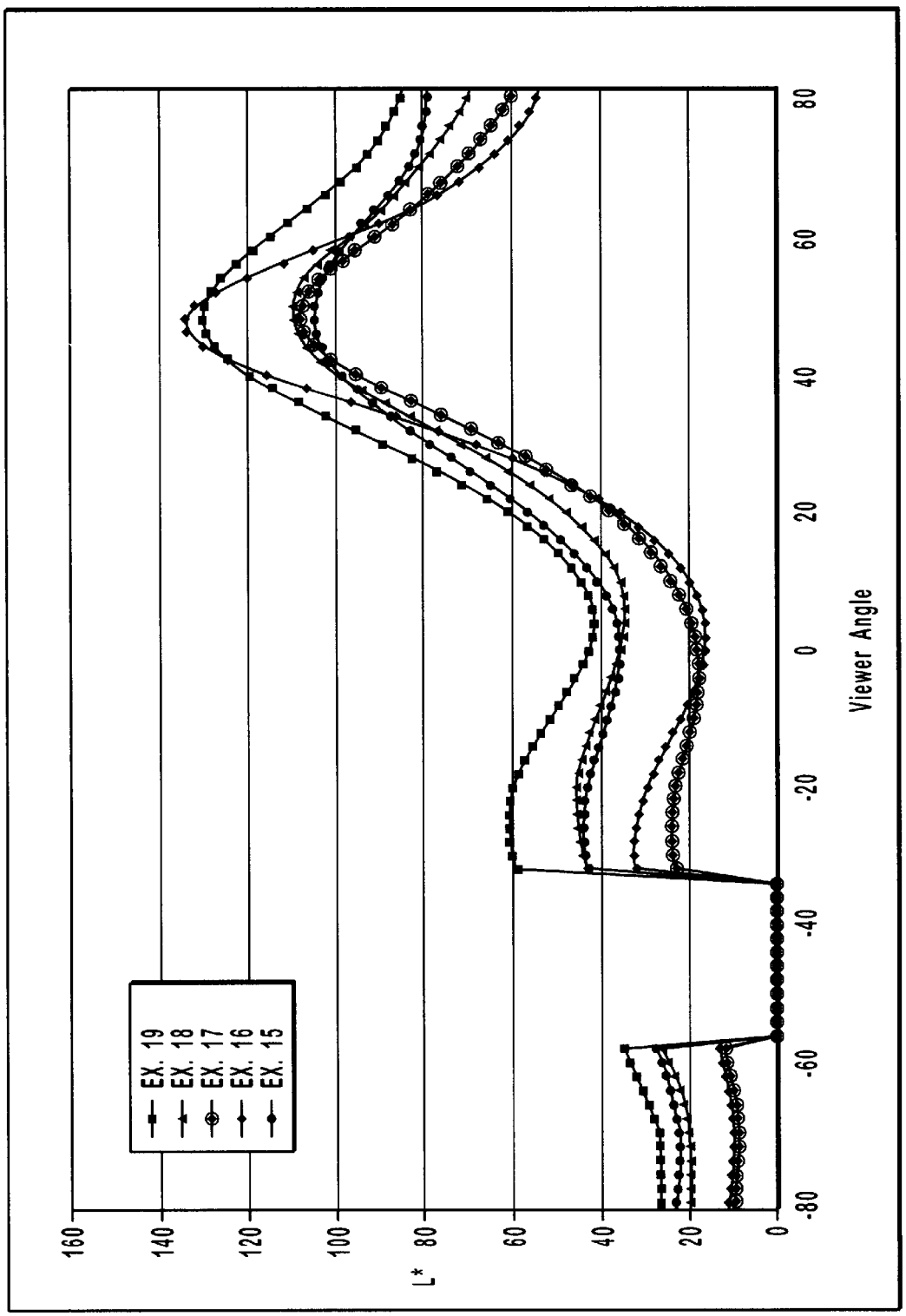
FIG. 34 is a graph of the lightness as a function of the viewer angle for various diffractive pigments of the invention.

FIG. 33 is a graph showing the color variation in the a*b* color space measured for the pigment drawdowns of Examples 15–19. The graph of FIG. 33 shows that a rainbow-like diffractive effect was observed in addition to the dark background of the pigments. FIG. 34 is a graph of the lightness (L*) as a function of the viewer angle for the pigments of Examples 15–19.

Figure 35:
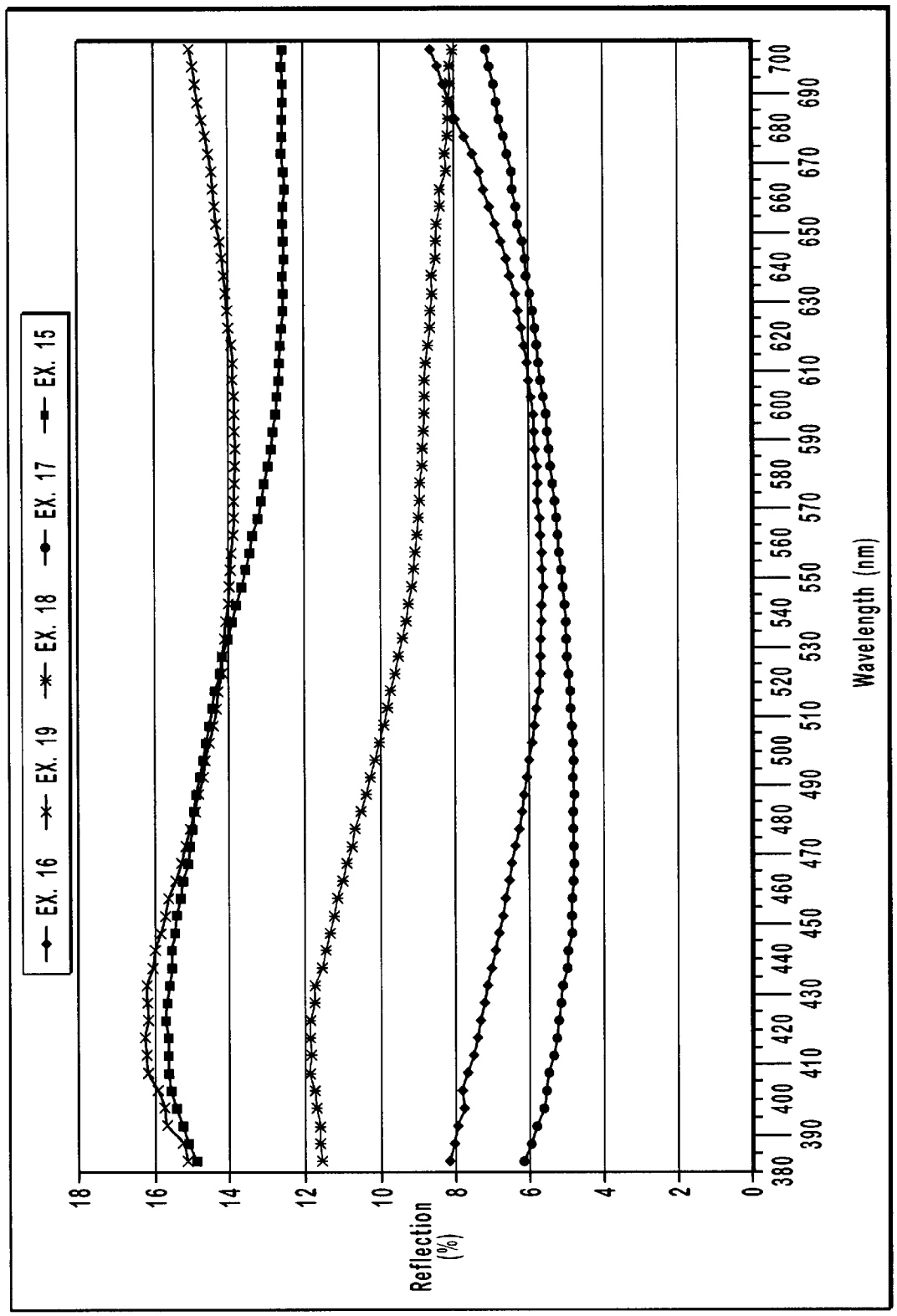
FIG. 35 is a graph of the reflection as a function of wavelength for various diffractive pigments of the invention.

FIG. 35 is a graph of the reflection as a function of wavelength for the pigments of Examples 15–19. The color data presented in Table 2 as well as the reflectivity graph of FIG. 35 were obtained using a spectrophotometer with diffuse 8 degrees integrating sphere geometry. The color data in Table 2 indicates low lightness and chroma as well as a* and b* values close to zero, indicating that the pigment drawdown samples did not present a dominating color. The graph of FIG. 35 also shows a low lightness (reflection) for the pigment drawdown samples, providing a further indication that the samples did not present a dominating color.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An achromatic diffractive pigment flake, comprising:
a reflector layer having a first major surface, an opposing second major surface, and at least one side surface;
a first dielectric layer overlying the first major surface of the reflector layer; and
a first absorber layer overlying the first dielectric layer;
said pigment flake having a diffractive structure thereon, and said pigment flake having an average background reflectivity in diffuse lighting conditions of less than about 30% in the visible spectrum.

2. The pigment flake of claim 1, wherein the diffractive structure has a pitch and amplitude selected to decrease the intensity of a zero order diffracted light beam in order to increase the intensity and color contrast of at least one higher order diffracted light beam.

3. The pigment flake of claim 1, wherein the diffractive structure is formed so as to produce an angular separation of first and second order diffracted light beams such that there is no angular superposition of wavelengths from about 400 nm to about 800 nm within the first and second order diffracted light beams.

4. The pigment flake of claim 1, wherein the diffractive structure is characterized at normal incidence by a ratio of zero order intensity to first order intensity of at least about 0.25, and an angular separation between zero order and first order diffracted light beams of at least about 30 degrees.

5. The pigment flake of claim 1, wherein the diffractive structure is a diffraction grating pattern or a holographic image pattern.

6. The pigment flake of claim 5, wherein the diffraction grating pattern has greater than about 1100 grating lines per mm.

7. The pigment flake of claim 5, wherein the diffraction grating pattern has at least about 1400 grating lines per mm and a grating depth of at least about 140 nm.

8. The pigment flake of claim 5, wherein the diffraction grating pattern has from about 1400 to about 3500 grating lines per mm, and a grating depth from about 140 nm to about 230 nm.

9. The pigment flake of claim 5, wherein the diffraction grating pattern has from about 1400 to about 2000 grating lines per mm, and a grating depth from about 160 nm to about 220 nm.

10. The pigment flake of claim 1, wherein the reflector layer is selected from the group consisting of aluminum, silver, platinum, tin, titanium, palladium, nickel, cobalt, rhodium, niobium, chromium, tungsten, molybdenum, tantalum, and compounds, alloys, or combinations thereof.

11. The pigment flake of claim 1, wherein the reflector layer has a physical thickness of about 40 nm to about 200 nm.

12. The pigment flake of claim 1, further comprising a second dielectric layer overlying the second major surface of the reflector layer, and a second absorber layer overlying the second dielectric layer.

13. The pigment flake of claim 12, wherein the first and second dielectric layers have an optical thickness of about 2 QWOT or less at about 400 nm or less.

14. The pigment flake of claim 12, wherein the first and second dielectric layers comprise a dielectric material having a refractive index from about 1.2 to about 4.5.

15. The pigment flake of claim 14, wherein the dielectric material is selected from the group consisting of magnesium fluoride, silicon dioxide, aluminum oxide, aluminum fluoride, cerium fluoride, lanthanum fluoride, neodymium fluoride, samarium fluoride, barium fluoride, calcium fluoride, lithium fluoride, zinc sulfide, zinc oxide, zirconium oxide, titanium dioxide, diamond-like carbon, indium oxide, indium-tin-oxide, tantalum pentoxide, ceric oxide, yttrium oxide, europium oxide, iron oxides, hafnium nitride, hafnium carbide, hafnium oxide, lanthanum oxide, magnesium oxide, neodymium oxide, praseodymium oxide, samarium oxide, antimony trioxide, silicon, silicon monoxide, selenium trioxide, tin oxide, tungsten trioxide, and mixtures or combinations thereof.

16. The pigment flake of claim 12, wherein the first and second dielectric layers have substantially the same optical thickness.

17. The pigment flake of claim 12, wherein the first and second dielectric layers are composed of the same material.

18. The pigment flake of claim 12, wherein the first and second dielectric layers are on each of the first and second major surfaces but not on the at least one side surface of the reflector layer.

19. The pigment flake of claim 12, wherein the first and second dielectric layers form part of a contiguous dielectric layer substantially surrounding the reflector layer.

20. The pigment flake of claim 12, wherein the first and second absorber layers comprise an absorbing material selected from the group consisting of chromium, nickel, aluminum, silver, copper, palladium, platinum, titanium, vanadium, cobalt, iron, tin, tungsten, molybdenum, rhodium, niobium, carbon, graphite, silicon, germanium, and compounds, alloys, or combinations thereof.

21. The pigment flake of claim 12, wherein the first and second absorber layers comprise an absorbing material selected from the group consisting of metal oxides, metal sulfides, metal carbides, metal nitrides, metal phosphides, cermets, and combinations thereof.

22. The pigment flake of claim 12, wherein the first and second absorber layers comprise an absorbing material selected from the group consisting of titanium nitride, titanium oxynitride, titanium carbide, titanium nitride carbide, titanium oxynitride carbide, titanium silicide, titanium diboride, titanium mixed with carbon, titanium mixed with tungsten, titanium mixed with silicon, titanium mixed with niobium, and combinations thereof.

23. The pigment flake of claim 12, wherein the first and second absorber layers have a physical thickness of about 3 nm to about 50 nm.

24. The pigment flake of claim 12, wherein the first and second absorber layers have substantially the same physical thickness.

25. The pigment flake of claim 12, wherein the first and second absorber layers are composed of the same material.

26. The pigment flake of claim 12, wherein the first and second absorber layers form part of a contiguous absorber layer substantially surrounding the dielectric layers.

27. The pigment flake of claim 19, wherein the first and second absorber layers form part of a contiguous absorber layer substantially surrounding the contiguous dielectric layer.

28. The pigment flake of claim 1, wherein the pigment flake has an average width of less than about 50 microns.

29. The pigment flake of claim 1, wherein the pigment flake has an average width of less than about 25 microns.

30. The pigment flake of claim 1, wherein the pigment flake has a physical thickness of less than about 2 microns.

31. The pigment flake of claim 1, wherein the pigment flake has a physical thickness of about 500 nm to about 1800 nm.

32. A diffractive pigment composition comprising a plurality of diffractive pigment flakes having a multilayer structure substantially the same as the pigment flake of claim 1.

33. An achromatic diffractive pigment flake, comprising:
   a central reflector layer having a first major surface, an opposing second major surface, and at least one side surface;
   a first dielectric layer overlying the first major surface of the reflector layer;
   a second dielectric layer overlying the second major surface of the reflector layer;
   a first absorber layer overlying the first dielectric layer; and
   a second absorber layer overlying the second dielectric layer;
   said pigment flake having a diffractive structure thereon, and said pigment flake having an average background reflectivity in diffuse lighting conditions of less than about 30% in the visible spectrum.

34. The pigment flake of claim 33, wherein the first and second dielectric layers have an optical thickness of about 1 QWOT or less at about 450 nm or less.

35. The pigment flake of claim 33, wherein the diffractive structure is a diffraction grating pattern or a holographic image pattern.

36. The pigment flake of claim 35, wherein the diffraction grating pattern has greater than about 1100 grating lines per mm.

37. The pigment flake of claim 35, wherein the diffraction grating pattern has at least about 1400 grating lines per mm and a grating depth of at least about 140 nm.

38. The pigment flake of claim 35, wherein the diffraction grating pattern has from about 1400 to about 3500 grating lines per mm, and a grating depth from about 140 nm to about 230 nm.

39. A diffractive pigment flake, comprising:
   a central support layer having a first major surface, an opposing second major surface, and at least one side surface;
   a first reflector layer overlying the first major surface of the support layer; and
   a second reflector layer overlying the second major surface of the support layer;
   said pigment flake having a diffractive structure thereon, and said pigment flake having an average background reflectivity in diffuse lighting conditions of less than about 30% at a spectral wavelength range from about 400 nm to about 700 nm.

40. The pigment flake of claim 39, wherein the diffractive structure comprises a diffraction grating pattern with at least about 1,400 grating lines per mm and a grating depth of at least about 140 nm.

41. The pigment flake of claim 39, wherein the first and second reflector layers are on each of the first and second major surfaces but not on the at least one side surface of the support layer.

42. The pigment flake of claim 39, wherein the first and second reflector layers form part of a contiguous reflector layer substantially surrounding the support layer.

43. The pigment flake of claim 39, wherein the support layer comprises a dielectric material selected from the group consisting of metal fluorides, metal oxides, metal sulfides, metal nitrides, metal carbides, and combinations thereof.

44. The pigment flake of claim 39, wherein the support layer comprises a dielectric material selected from the group consisting of magnesium fluoride, silicon monoxide, silicon dioxide, aluminum oxide, titanium dioxide, tungsten oxide, aluminum nitride, boron nitride, boron carbide, tungsten carbide, titanium carbide, titanium nitride, silicon nitride, zinc sulfide, glass flakes, diamond-like carbon, and combinations thereof.

45. The pigment flake of claim 39, wherein the support layer comprises a synthetic platelet material.

46. The pigment flake of claim 39, wherein the support layer comprises a semiconductive material or a conductive material.

47. The pigment flake of claim 39, wherein the support layer has a physical thickness of about 10 nm to about 1,000 nm.

48. The pigment flake of claim 39, further comprising one or more additional coating layers overlying the reflector layers.

49. The pigment flake of claim 48, wherein the one or more additional coating layers comprise one or more dielectric layers.

50. The pigment flake of claim 49, wherein the one or more dielectric layers have an optical thickness of about 2 QWOT or less at a selected design wavelength.

51. The pigment flake of claim 50, further comprising one or more absorber layers overlying the one or more dielectric layers.

52. An achromatic diffractive pigment composition comprising a plurality of diffractive pigment flakes having a multilayer structure substantially the same as the pigment flake of claim 39.

53. An achromatic diffractive pigment composition, comprising:
 a pigment medium; and
 a plurality of pigment flakes having diffractive structures thereon and dispersed in the pigment medium, the pigment flakes having a multilayer structure comprising:
  a central reflector layer having a first major surface, and an opposing second major surface;
  a first dielectric layer overlying the first major surface of the reflector layer;
  a second dielectric layer overlying the second major surface of the reflector layer;
  a first absorber layer overlying the first dielectric layer; and
  a second absorber layer overlying the second dielectric layer;
 said first and second dielectric layers having an optical thickness at a selected design wavelength such that the pigment composition exhibits an iridescent diffractive effect over an achromatic background when applied to an object.

54. The composition of claim 53, wherein the pigment medium comprises a material selected from the group consisting of acrylic melamine, urethanes, polyesters, vinyl resins, acrylates, methyl methacrylate, ABS resins, epoxies, styrenes, ink and paint formulations based on alkyd resins, and mixtures thereof.

55. The composition of claim 53, wherein the composition comprises an ink.

56. The composition of claim 53, wherein the composition comprises a paint.

57. The composition of claim 56, wherein the paint is an automotive paint.

58. The composition of claim 53, wherein the pigment medium is a cosmetic formulation.

59. The composition of claim 53, wherein the pigment medium is a plastic material capable of being molded or extruded.

60. The composition of claim 53, wherein the diffractive structures have from about 1400 to about 3500 grating lines per mm, and a grating depth from about 140 nm to about 230 nm.

61. The composition claim 53, wherein the first and second dielectric layers form part of a contiguous dielectric layer substantially surrounding the reflector layer.

62. The composition of claim 53, wherein the first and second absorber layers form part of a contiguous absorber layer substantially surrounding the dielectric layers.

63. The composition of claim 61, wherein the first and second absorber layers form part of a contiguous absorber layer substantially surrounding the contiguous dielectric layer.

64. The composition of claim 53, wherein the composition produces a substantially continuous tone iridescent diffractive effect when applied to an object.

65. The composition of claim 53, further comprising a plurality of non-diffractive pigment flakes dispersed in the pigment medium.

66. The composition of claim 53, further comprising a plurality of additional diffractive flakes dispersed in the pigment medium, the additional diffractive flakes having a symmetrical or asymmetrical flake layer structure and being chromatic or high reflectivity achromatic flakes.

67. The composition of claim 53, wherein the pigment flakes have a preselected size and loading in the pigment medium suitable for use in a printing process selected from the group consisting of intaglio, lithography, silk screen, gravure, doctor blade, and wet coating.

68. A coated article comprising:
 an object having one or more surfaces; and
 an achromatic diffractive coating layer overlying at least a portion of the one or more surfaces, the coating layer comprising a diffractive composition comprising:
  a pigment medium; and
  a plurality of pigment flakes having diffractive structures thereon and dispersed in the pigment medium, the pigment flakes having a multilayer structure comprising:
   a central reflector layer having a first major surface, and an opposing second major surface;
   a first dielectric layer overlying the first major surface of the reflector layer;
   a second dielectric layer overlying the second major surface of the reflector layer;
   a first absorber layer overlying the first dielectric layer; and
   a second absorber layer overlying the second dielectric layer;
  said first and second dielectric layers having an optical thickness at a selected design wavelength such that the pigment composition exhibits an iridescent diffractive effect over an achromatic background when applied to an object.

69. The coated article claim 68, wherein the diffractive coating layer comprises an ink or paint.

70. The coated article of claim 68, further comprising a base coating layer under the diffractive coating layer.

71. The coated article of claim 68, further comprising a transparent top coating layer overlying the diffractive coating layer.

72. The coated article of claim 68, wherein the coated article is a motor vehicle.

73. The coated article of claim 68, wherein the coated article is a security document.

74. The coated article of claim 68, further comprising a non-diffractive coating layer partially overlying the diffractive coating layer.

75. The coated article of claim 68, further comprising a plurality of non-diffractive pigment flakes dispersed in the pigment medium.

76. An achromatic diffractive foil, comprising:
a substrate having a surface with a diffractive structure thereon;
a reflector layer overlying the surface of the substrate;
a dielectric layer overlying the reflector layer; and
an absorber layer overlying the dielectric layer;
said foil exhibiting an iridescent diffractive effect over an achromatic background, the foil having an average background reflectivity in diffuse lighting conditions of less than about 30% in the visible spectrum.

77. The foil of claim 76, wherein the dielectric layer has an optical thickness of about 2 QWOT or less at about 400 nm or less.

78. The foil of claim 76, wherein the diffractive structure is a diffraction grating pattern or a holographic image pattern.

79. The foil of claim 78, wherein the diffraction grating pattern has at least about 1400 grating lines per mm and a grating depth of at least about 140 nm.

80. The foil of claim 78, wherein the diffraction grating pattern has from about 1400 to about 3500 grating lines per mm, and a grating depth from about 140 nm to about 230 nm.

81. An achromatic diffractive foil, comprising:
a reflector layer;
a dielectric layer overlying the reflector layer; and
an absorber layer overlying the dielectric layer;
said foil having a diffractive structure and exhibiting an iridescent diffractive effect over an achromatic background, the foil having an average background reflectivity in diffuse lighting conditions of less than about 30% at a spectral wavelength range from about 400 nm to about 700 nm.

82. The foil of claim 81, further comprising a web carrier with either the reflector layer or the absorber layer deposited over the web carrier.

83. The foil of claim 82, wherein the web carrier further comprises a release layer thereon disposed between the web carrier and the reflector layer, or the web carrier and the absorber layer.

84. The foil of claim 83, further comprising an adhesive layer for laminating the foil to a substrate.

85. The foil of claim 84, wherein the adhesive layer is selected from the group consisting of a hot stampable adhesive, a pressure sensitive adhesive, a permanent adhesive, a transparent adhesive, and a UV curable adhesive.

86. The foil of claim 84, wherein the adhesive layer is on the reflector layer or the absorber layer.

87. A diffractive structure comprising:
one or more reflective layers;
the reflective layers characterized by an average background reflectivity in diffuse lighting conditions of less than about 30% at a spectral wavelength range from about 400 nm to about 700 nm, and a variation in reflectivity from the average of less than about 5 percent from about 400 nm to about 700 nm;
wherein a reflected color is observable in at least one of the higher order diffracted beams.

88. The diffractive structure of claim 87, wherein the one or more reflective layers comprises a material selected from the group consisting of a metal, a metal alloy, a metal compound, a semiconductor, and combinations thereof, the material in its native form having a reflectivity of less than about 50%.

89. The diffractive structure of claim 87, further comprising one or more layers of a dielectric material disposed between the one or more reflective layers and a source of illumination.

90. The diffractive structure of claim 87, further comprising one or more layers of a material selected from the group consisting of a metal, a metal alloy, a metal compound, a semiconductor, and combinations thereof.

91. The diffractive structure of claim 87, further comprising an absorbing layer disposed between the one or more reflective layers and a source of illumination, wherein the absorbing layer comprises one or more organic dyes or dye compounds.

92. The diffractive structure of claim 87, wherein the one or more reflective layers are formed by the interface between a substantially transparent layer and another material, the transparent layer and other material having a substantial difference in refractive index.

93. The diffractive structure of claim 92, further comprising a substantially opaque absorbing layer, wherein the transparent layer is disposed between the opaque absorbing layer and a source of illumination.

94. An achromatic diffractive pigment flake, comprising:
a diffractive structure comprising:
one or more reflective layers;
the reflective layers characterized by an average background reflectivity in diffuse lighting conditions of less than about 30% at a spectral wavelength range from about 400 nm to about 700 nm, and a variation in reflectivity from the average of less than about 5 percent from about 400 nm to about 700 nm;
wherein a reflected color is observable in at least one of the higher order diffracted beams.

95. An achromatic diffractive pigment flake, comprising:
a central layer comprising aluminum or chromium, the central layer having a first major surface and an opposing second major surface;
a layer of magnesium fluoride overlying each of the first and second major surfaces of the central layer, each layer of magnesium fluoride having an optical thickness of about 1 QWOT or less at about 450 nm or less;
a chromium layer overlying each layer of magnesium fluoride; and
an outer layer covering each of the chromium layers and having sufficient modulus of elasticity and thickness to render the diffractive pigment flake substantially rigid;
said pigment flake having a diffractive structure thereon and said pigment flake exhibiting an iridescent diffractive effect over an achromatic background.

96. The pigment flake of claim 95, wherein the outer layer provides environmental protection to one or more interior layers.

97. The pigment flake of claim 95, wherein the outer layer is substantially transparent.

98. The pigment flake of claim 95, wherein the outer layer comprises magnesium fluoride.

99. An achromatic diffractive pigment flake, comprising:
a central opaque layer having a first major surface, an opposing second major surface, and at least one side surface;
a first dielectric layer overlying the first major surface of the reflector layer; and
a second dielectric layer overlying the second major surface of the reflector layer;
said pigment flake having a diffractive structure thereon and exhibiting an iridescent diffractive effect over an achromatic background.

100. The pigment flake of claim 99, wherein the first and second dielectric layers comprises magnesium fluoride.

101. The pigment flake of claim 99, wherein the central opaque layer comprises chromium.

102. The pigment flake of claim 99, wherein the first and second dielectric layers form part of a contiguous dielectric layer substantially surrounding the central opaque layer.

103. An achromatic diffractive pigment flake, comprising:
a reflector layer having a first major surface, an opposing second major surface, and at least one side surface;
a first dielectric layer overlying the first major surface of the reflector layer; a first absorber layer overlying the first dielectric layer;
a second dielectric layer overlying the first absorber layer; and a second absorber layer overlying the second dielectric layer;
said pigment flake having a diffractive structure thereon, and the first and second dielectric layers having an optical thickness of about 2 QWOT or less at about 500 nm or less.

104. The pigment flake of claim 103, further comprising:
a third dielectric layer overlying the second major surface of the reflector layer;
a third absorber layer overlying the third dielectric layer;
a fourth dielectric layer overlying the third absorber layer; and a fourth absorber layer overlying the fourth second dielectric layer.

105. The pigment flake of claim 104, wherein the third and fourth dielectric layers have an optical thickness of about 2 QWOT or less at about 500 nm or less.

106. The pigment flake of claim 104, wherein the second and fourth absorber layers form part of a contiguous absorbing layer substantially surrounding the underlying layers.

107. The pigment flake of claim 104, further comprising an outer dielectric layer overlying each of the second and fourth absorber layers.

108. The pigment flake of claim 106, further comprising an outer dielectric layer substantially surrounding the contiguous absorbing layer.

109. A diffractive pigment composition comprising a plurality of diffractive pigment flakes having a multilayer structure substantially the same as the pigment flake of claim 104.

110. An achromatic diffractive foil, comprising:
a reflector layer;
a first dielectric layer overlying the reflector layer;
a first absorber layer overlying the first dielectric layer;
a second dielectric layer overlying the first absorber layer; and a second absorber layer overlying the second dielectric layer;
said foil having a diffractive structure thereon, and the first and second dielectric layers having an optical thickness of about 2 QWOT or less at about 500 nm or less.

111. The foil of claim 110, further comprising an outer dielectric layer overlying the second absorber layer.

112. An interference structure, comprising:
a central dielectric layer having a first major surface, an opposing second second major surface, and at least one side surface;
a first semi-transparent/semi-reflective layer overlying the first major surface of the central dielectric layer; and
a second semi-transparent/semi-reflective layer overlying the second major surface of the central dielectric layer;
said interference structure having a diffractive structure thereon, and the central dielectric layer has an optical thickness of about 1 QWOT at about 200 nm to about 2 QWOT at about 500 nm.

113. The interference structure of claim 112, wherein the central dielectric layer has an optical thickness of about 1 QWOT at about 300 nm to about 1 QWOT at about 700 nm.

114. The interference structure of claim 112, wherein the central dielectric layer comprises magnesium fluoride.

115. The interference structure of claim 112, wherein the first and second semi-transparent/semi-reflective layers comprise chromium.

116. The interference structure of claim 112, wherein the first and second semi-transparent/semi-reflective layers form part of a contiguous semi-transparent/semi-reflective layer substantially surrounding the central dielectric layer.

117. The interference structure of claim 112, further comprising a first outer dielectric layer overlying the first semi-transparent/semi-reflective layer, and a second outer dielectric layer overlying the second semi-transparent/semi-reflective layer.

118. The interference structure of claim 116, further comprising an outer dielectric layer substantially surrounding the contiguous semi-transparent/semi-reflective layer.

119. The interference structure of claim 112, further comprising an outer dielectric layer substantially surrounding the first and second semi-transparent/semi-reflective layers.

120. A diffractive pigment flake comprising the interference structure of claim 112.

121. A diffractive pigment flake comprising the interference structure of claim 117.

122. A diffractive pigment composition comprising a plurality of diffractive pigment flakes having a multilayer structure substantially the same as the pigment flake of claim 120.

123. A diffractive foil comprising the interference structure of claim 112.

* * * * *